United States Patent
Littlefield et al.

(10) Patent No.: US 10,275,318 B2
(45) Date of Patent: Apr. 30, 2019

(54) DATA RECOVERY OPERATIONS, SUCH AS RECOVERY FROM MODIFIED NETWORK DATA MANAGEMENT PROTOCOL DATA

(71) Applicant: Commvault Systems, Inc., Tinton Falls, NJ (US)

(72) Inventors: Duncan Alden Littlefield, Millstone Township, NJ (US); Vimal Kumar Nallathambi, Ocean City, NJ (US); Girish Chanchlani, Lawrenceville, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

(21) Appl. No.: 15/419,272

(22) Filed: Jan. 30, 2017

(65) Prior Publication Data
US 2017/0139780 A1    May 18, 2017

Related U.S. Application Data

(60) Continuation of application No. 15/005,209, filed on Jan. 25, 2016, now Pat. No. 9,557,929, which is a
(Continued)

(51) Int. Cl.
*G06F 11/14*       (2006.01)
*G06F 3/06*        (2006.01)

(52) U.S. Cl.
CPC .......... *G06F 11/1453* (2013.01); *G06F 3/065* (2013.01); *G06F 3/067* (2013.01);
(Continued)

(58) Field of Classification Search
CPC ...... G06F 11/1453; G06F 3/065; G06F 3/067; G06F 3/0619; G06F 3/0641; G06F 2201/84
See application file for complete search history.

(56) References Cited

U.S. PATENT DOCUMENTS

| 4,686,620 A | 8/1987 | Ng |
| 4,995,035 A | 2/1991 | Cole et al. |

(Continued)

FOREIGN PATENT DOCUMENTS

| EP | 0259912 A1 | 3/1988 |
| EP | 0405926 A2 | 1/1991 |

(Continued)

OTHER PUBLICATIONS

About Backupify [retrieved on Aug. 1, 2014], Retrieved from internet: http://web.archive.org/web/20120122064518/https://www.backupify.com/about; published on Jan. 22, 2012 as per Wayback Machine.

(Continued)

*Primary Examiner* — Michael Alsip
(74) *Attorney, Agent, or Firm* — Perkins Coie LLP

(57) ABSTRACT

The systems and methods herein permit storage systems to correctly perform data recovery, such as direct access recovery, of Network Data Management Protocol ("NDMP") backup data that was modified prior to being stored in secondary storage media, such as tape. For example, as described in greater detail herein, the systems and methods may permit NDMP backup data to be encrypted, compressed, deduplicated, and/or otherwise modified prior to storage. The systems and methods herein also permit a user to perform a precautionary snapshot of the current state of data (e.g., primary data) prior to reverting data to a previous state using point-in-time data.

15 Claims, 8 Drawing Sheets

Related U.S. Application Data division of application No. 13/241,625, filed on Sep. 23, 2011, now Pat. No. 9,244,779.

(60) Provisional application No. 61/388,554, filed on Sep. 30, 2010.

(52) U.S. Cl.
CPC .......... *G06F 3/0619* (2013.01); *G06F 3/0641* (2013.01); *G06F 3/0665* (2013.01); *G06F 11/1469* (2013.01); *G06F 11/1448* (2013.01); *G06F 2201/84* (2013.01)

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,164 A | 8/1993 | Pavlidis et al. |
| 5,241,668 A | 8/1993 | Eastridge et al. |
| 5,241,670 A | 8/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,367,698 A | 11/1994 | Webber et al. |
| 5,410,700 A | 4/1995 | Fecteau et al. |
| 5,412,668 A | 5/1995 | Dewey |
| 5,448,724 A | 9/1995 | Hayashi |
| 5,455,926 A | 10/1995 | Keele et al. |
| 5,491,810 A | 2/1996 | Allen |
| 5,495,457 A | 2/1996 | Takagi et al. |
| 5,495,607 A | 2/1996 | Pisello et al. |
| 5,499,364 A | 3/1996 | Klein et al. |
| 5,504,873 A | 4/1996 | Martin et al. |
| 5,506,986 A | 4/1996 | Healy |
| 5,544,345 A | 8/1996 | Carpenter et al. |
| 5,544,347 A | 8/1996 | Yanai et al. |
| 5,548,521 A | 8/1996 | Krayer et al. |
| 5,559,957 A | 9/1996 | Balk |
| 5,608,865 A | 3/1997 | Midgely et al. |
| 5,619,644 A | 4/1997 | Crockett et al. |
| 5,638,509 A | 6/1997 | Dunphy et al. |
| 5,673,381 A | 9/1997 | Huai et al. |
| 5,677,900 A | 10/1997 | Nishida et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,815,662 A | 9/1998 | Ong |
| 5,832,522 A | 11/1998 | Blickenstaff et al. |
| 5,860,068 A | 1/1999 | Cook |
| 5,875,478 A | 2/1999 | Blumenau |
| 5,875,481 A | 2/1999 | Ashton et al. |
| 5,887,134 A | 3/1999 | Ebrahim |
| 5,893,139 A | 4/1999 | Kamiyama et al. |
| 5,898,593 A | 4/1999 | Baca et al. |
| 5,901,327 A | 5/1999 | Ofek |
| 5,924,102 A | 7/1999 | Perks |
| 5,950,205 A | 9/1999 | Aviani, Jr. |
| 5,958,005 A | 9/1999 | Thorne et al. |
| 5,974,563 A | 10/1999 | Beeler, Jr. |
| 5,978,577 A | 11/1999 | Rierden et al. |
| 5,983,239 A | 11/1999 | Cannon |
| 6,014,695 A | 1/2000 | Yamashita et al. |
| 6,021,415 A | 2/2000 | Cannon et al. |
| 6,023,705 A | 2/2000 | Bellinger et al. |
| 6,026,398 A | 2/2000 | Brown et al. |
| 6,026,414 A | 2/2000 | Anglin |
| 6,052,735 A | 4/2000 | Ulrich et al. |
| 6,076,148 A | 6/2000 | Kedem |
| 6,088,694 A | 7/2000 | Burns et al. |
| 6,094,416 A | 7/2000 | Ying |
| 6,131,095 A | 10/2000 | Low et al. |
| 6,131,099 A | 10/2000 | Johnson et al. |
| 6,131,147 A | 10/2000 | Takagi |
| 6,131,190 A | 10/2000 | Sidwell |
| 6,137,864 A | 10/2000 | Yaker |
| 6,148,412 A | 11/2000 | Cannon et al. |
| 6,149,316 A | 11/2000 | Harari et al. |
| 6,154,738 A | 11/2000 | Call |
| 6,154,787 A | 11/2000 | Urevig et al. |
| 6,161,111 A | 12/2000 | Mutalik et al. |
| 6,167,402 A | 12/2000 | Yeager |
| 6,195,794 B1 | 2/2001 | Buxton |
| 6,212,512 B1 | 4/2001 | Barney et al. |
| 6,223,205 B1 | 4/2001 | Harchol-Balter et al. |
| 6,246,882 B1 | 6/2001 | Lachance |
| 6,260,069 B1 | 7/2001 | Anglin |
| 6,266,678 B1 | 7/2001 | McDevitt et al. |
| 6,266,784 B1 | 7/2001 | Hsiao et al. |
| 6,269,382 B1 | 7/2001 | Cabrera et al. |
| 6,269,431 B1 | 7/2001 | Dunham |
| 6,275,953 B1 | 8/2001 | Vahalia et al. |
| 6,301,592 B1 | 10/2001 | Aoyama et al. |
| 6,304,880 B1 | 10/2001 | Kishi |
| 6,308,245 B1 | 10/2001 | Johnson et al. |
| 6,324,581 B1 | 11/2001 | Xu et al. |
| 6,328,766 B1 | 12/2001 | Long |
| 6,330,570 B1 | 12/2001 | Crighton |
| 6,330,572 B1 | 12/2001 | Sitka |
| 6,330,642 B1 | 12/2001 | Carteau |
| 6,338,006 B1 | 1/2002 | Jesionowski et al. |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,356,901 B1 | 3/2002 | MacLeod et al. |
| 6,366,900 B1 | 4/2002 | Hu |
| 6,374,336 B1 | 4/2002 | Peters et al. |
| 6,389,432 B1 | 5/2002 | Pothapragada et al. |
| 6,418,441 B1 | 7/2002 | Call |
| 6,418,478 B1 | 7/2002 | Ignatius et al. |
| 6,421,711 B1 | 7/2002 | Blumenau et al. |
| 6,434,682 B1 | 8/2002 | Ashton et al. |
| 6,457,017 B2 | 9/2002 | Watkins et al. |
| 6,484,166 B1 | 11/2002 | Maynard |
| 6,487,561 B1 | 11/2002 | Ofek et al. |
| 6,490,666 B1 | 12/2002 | Cabrera et al. |
| 6,496,744 B1 | 12/2002 | Cook |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,550,057 B1 | 4/2003 | Bowman-Amuah |
| 6,564,228 B1 | 5/2003 | O'Connor |
| 6,615,349 B1 | 9/2003 | Hair |
| 6,616,047 B2 | 9/2003 | Catan |
| 6,658,436 B2 | 12/2003 | Oshinsky et al. |
| 6,658,526 B2 | 12/2003 | Nguyen et al. |
| 6,662,281 B2 | 12/2003 | Ballard et al. |
| 6,669,832 B1 | 12/2003 | Saito et al. |
| 6,674,924 B2 | 1/2004 | Wright et al. |
| 6,704,839 B2 | 3/2004 | Butterworth et al. |
| 6,721,334 B1 | 4/2004 | Ketcham |
| 6,732,293 B1 | 5/2004 | Schneider |
| 6,757,794 B2 | 6/2004 | Cabrera et al. |
| 6,771,595 B1 | 8/2004 | Gilbert et al. |
| 6,785,078 B2 | 8/2004 | Basham et al. |
| 6,789,161 B1 | 9/2004 | Blendermann et al. |
| 6,802,025 B1 | 10/2004 | Thomas et al. |

(56) References Cited

U.S. PATENT DOCUMENTS

| | | |
|---|---|---|
| 6,820,035 B1 | 11/2004 | Zahavi |
| 6,851,031 B2 | 2/2005 | Trimmer et al. |
| 6,862,622 B2 | 3/2005 | Jorgensen |
| 6,909,356 B2 | 6/2005 | Brown et al. |
| 6,922,687 B2 | 7/2005 | Vernon |
| 6,934,879 B2 | 8/2005 | Misra et al. |
| 6,941,370 B2 | 9/2005 | Boies et al. |
| 6,950,723 B2 | 9/2005 | Gallo et al. |
| 6,968,351 B2 | 11/2005 | Butterworth |
| 6,968,479 B2 | 11/2005 | Wyatt et al. |
| 6,972,918 B2 | 12/2005 | Kokami et al. |
| 6,973,369 B2 | 12/2005 | Trimmer et al. |
| 6,973,553 B1 | 12/2005 | Archibald, Jr. et. al. |
| 6,983,351 B2 | 1/2006 | Gibble et al. |
| 7,006,435 B1 | 2/2006 | Davies et al. |
| 7,010,387 B2 | 3/2006 | Lantry et al. |
| 7,012,529 B2 | 3/2006 | Sajkowsky |
| 7,034,683 B2 | 4/2006 | Ghazarian |
| 7,035,880 B1 | 4/2006 | Crescenti et al. |
| 7,058,649 B2 | 6/2006 | Ough et al. |
| 7,069,466 B2 | 6/2006 | Trimmer et al. |
| 7,082,441 B1 | 7/2006 | Zahavi et al. |
| 7,085,786 B2 | 8/2006 | Carlson et al. |
| 7,085,904 B2 | 8/2006 | Mizuno et al. |
| 7,093,089 B2 | 8/2006 | de Brebisson |
| 7,096,269 B2 | 8/2006 | Yamagami |
| 7,096,315 B2 | 8/2006 | Takeda et al. |
| 7,103,619 B1 | 9/2006 | Rajpurkar et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,118,034 B2 | 10/2006 | Baldassari et al. |
| 7,120,823 B2 | 10/2006 | Foster et al. |
| 7,130,970 B2 | 10/2006 | Devassy et al. |
| 7,136,720 B2 | 11/2006 | Deckers |
| 7,146,377 B2 | 12/2006 | Nowicki et al. |
| 7,155,465 B2 | 12/2006 | Lee et al. |
| 7,155,486 B2 | 12/2006 | Aoshima et al. |
| 7,162,496 B2 | 1/2007 | Amarendran et al. |
| 7,162,604 B1 | 1/2007 | Nourmohamadian et al. |
| 7,162,693 B2 | 1/2007 | Yamanaka et al. |
| 7,165,059 B1 | 1/2007 | Shah et al. |
| 7,191,283 B2 | 3/2007 | Amemiya et al. |
| 7,197,490 B1 | 3/2007 | English |
| 7,200,621 B2 | 4/2007 | Beck et al. |
| 7,203,944 B1 | 4/2007 | van Rietschote et al. |
| 7,209,949 B2 | 4/2007 | Mousseau et al. |
| 7,213,118 B2 | 5/2007 | Goodman et al. |
| 7,216,244 B2 | 5/2007 | Amano |
| 7,246,140 B2 | 7/2007 | Therrien et al. |
| 7,246,207 B2 | 7/2007 | Kottomtharayil et al. |
| 7,246,258 B2 | 7/2007 | Chen et al. |
| 7,251,218 B2 | 7/2007 | Jorgensen |
| 7,275,063 B2 | 9/2007 | Horn |
| 7,277,246 B2 | 10/2007 | Barbian et al. |
| 7,277,953 B2 | 10/2007 | Wils et al. |
| 7,281,032 B2 | 10/2007 | Kodama |
| 7,287,047 B2 | 10/2007 | Kavuri |
| 7,293,133 B1 | 11/2007 | Colgrove et al. |
| 7,302,540 B1 | 11/2007 | Holdman et al. |
| 7,315,923 B2 | 1/2008 | Retnamma et al. |
| 7,343,356 B2 | 3/2008 | Prahlad et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,379,850 B2 | 5/2008 | Sprogis et al. |
| 7,395,282 B1 | 7/2008 | Crescenti et al. |
| 7,395,387 B2 | 7/2008 | Berkowitz et al. |
| 7,395,446 B2 | 7/2008 | Luke et al. |
| 7,398,524 B2 | 7/2008 | Shapiro |
| 7,401,728 B2 | 7/2008 | Markham et al. |
| 7,412,433 B2 | 8/2008 | Anglin et al. |
| 7,418,464 B2 | 8/2008 | Cannon et al. |
| 7,421,312 B2 | 9/2008 | Trossell |
| 7,434,090 B2 | 10/2008 | Hartung et al. |
| 7,447,907 B2 | 11/2008 | Hart, III et al. |
| 7,451,283 B2 | 11/2008 | Chen et al. |
| 7,454,569 B2 | 11/2008 | Kavuri et al. |
| 7,467,167 B2 | 12/2008 | Patterson |
| 7,472,238 B1 | 12/2008 | Gokhale et al. |
| 7,500,053 B1 | 3/2009 | Kavuri et al. |
| 7,529,782 B2 | 5/2009 | Prahlad et al. |
| 7,536,424 B2 | 5/2009 | Barzilai et al. |
| 7,539,702 B2 | 5/2009 | Deshmukh et al. |
| 7,539,783 B2 | 5/2009 | Kochunni et al. |
| 7,565,340 B2 | 7/2009 | Herlocker et al. |
| 7,581,011 B2 | 8/2009 | Teng |
| 7,584,227 B2 | 9/2009 | Gokhale et al. |
| 7,584,298 B2 | 9/2009 | Klinker et al. |
| 7,587,749 B2 | 9/2009 | Leser et al. |
| 7,596,586 B2 | 9/2009 | Gokhale et al. |
| 7,603,518 B2 | 10/2009 | Kottomtharayil |
| 7,617,262 B2 | 11/2009 | Prahlad et al. |
| 7,617,392 B2 | 11/2009 | Hair |
| 7,627,617 B2 | 12/2009 | Kavuri et al. |
| 7,644,245 B2 | 1/2010 | Prahlad et al. |
| 7,653,671 B2 | 1/2010 | Ikezawa et al. |
| 7,657,666 B2 | 2/2010 | Kottomtharayil et al. |
| 7,659,820 B2 | 2/2010 | Schnee et al. |
| 7,660,812 B2 | 2/2010 | Findlay et al. |
| 7,680,843 B1 | 3/2010 | Panchbudhe et al. |
| 7,689,510 B2 | 3/2010 | Lamkin et al. |
| 7,693,832 B2 | 4/2010 | Vargas et al. |
| 7,702,659 B2 | 4/2010 | Ban et al. |
| 7,702,831 B2 | 4/2010 | Ma et al. |
| 7,707,060 B2 | 4/2010 | Chainer et al. |
| 7,712,094 B2 | 5/2010 | Shapiro |
| 7,720,817 B2 | 5/2010 | Stager et al. |
| 7,734,669 B2 | 6/2010 | Kottomtharayil et al. |
| 7,739,450 B2 | 6/2010 | Kottomtharayil |
| 7,747,579 B2 | 6/2010 | Prahlad et al. |
| 7,748,610 B2 | 7/2010 | Bell et al. |
| 7,751,628 B1 | 7/2010 | Reisman |
| 7,765,167 B2 | 7/2010 | Prahlad et al. |
| 7,765,369 B1 | 7/2010 | Prahlad et al. |
| 7,805,416 B1 | 9/2010 | Compton et al. |
| 7,809,699 B2 | 10/2010 | Passmore et al. |
| 7,809,914 B2 | 10/2010 | Kottomtharayil et al. |
| 7,818,417 B2 | 10/2010 | Ginis et al. |
| 7,822,715 B2 | 10/2010 | Petruzzo |
| 7,831,566 B2 | 11/2010 | Kavuri et al. |
| 7,840,537 B2 | 11/2010 | Gokhale et al. |
| 7,844,573 B2 | 11/2010 | Amarendran et al. |
| 7,849,266 B2 | 12/2010 | Kavuri et al. |
| 7,861,011 B2 | 12/2010 | Kottomtharayil et al. |
| 7,873,802 B2 | 1/2011 | Gokhale et al. |
| 7,877,351 B2 | 1/2011 | Crescenti et al. |
| 7,877,362 B2 | 1/2011 | Gokhale et al. |
| 7,889,847 B2 | 2/2011 | Gainsboro |
| 7,890,796 B2 | 2/2011 | Pawar et al. |
| 7,904,350 B2 | 3/2011 | Ayala et al. |
| 7,917,473 B2 | 3/2011 | Kavuri et al. |
| 7,917,695 B2 | 3/2011 | Ulrich et al. |
| 7,934,071 B2 | 4/2011 | Abe et al. |
| 7,937,365 B2 | 5/2011 | Prahlad et al. |
| 7,937,393 B2 | 5/2011 | Prahlad et al. |
| 7,945,810 B2 | 5/2011 | Soran et al. |
| 7,953,802 B2 | 5/2011 | Mousseau et al. |
| 7,966,293 B1 | 6/2011 | Owara et al. |
| 7,969,306 B2 | 6/2011 | Ebert et al. |
| 7,975,061 B1 | 7/2011 | Gokhale et al. |
| 7,987,319 B2 | 7/2011 | Kottomtharayil |
| 8,005,913 B1 | 8/2011 | Carlander |
| 8,006,111 B1 | 8/2011 | Faibish et al. |
| 8,032,569 B2 | 10/2011 | Oshita et al. |
| 8,040,727 B1 | 10/2011 | Harari |
| 8,051,043 B2 | 11/2011 | Young |
| 8,112,605 B2 | 2/2012 | Kavuri |
| 8,140,786 B2 | 3/2012 | Bunte et al. |
| 8,156,086 B2 | 4/2012 | Lu et al. |
| 8,161,318 B2 | 4/2012 | D'Souza et al. |
| 8,170,995 B2 | 5/2012 | Prahlad et al. |

(56) References Cited

U.S. PATENT DOCUMENTS

| | | | |
|---|---|---|---|
| 8,195,800 B2 | 6/2012 | Tameshige et al. |
| 8,200,638 B1 | 6/2012 | Zheng et al. |
| 8,204,862 B1 | 6/2012 | Paulzagade et al. |
| 8,209,293 B2 | 6/2012 | Gokhale et al. |
| 8,219,524 B2 | 7/2012 | Gokhale |
| 8,229,954 B2 | 7/2012 | Kottomtharayil et al. |
| 8,230,066 B2 | 7/2012 | Heil |
| 8,230,171 B2 | 7/2012 | Kottomtharayil |
| 8,230,195 B2 | 7/2012 | Amarendran et al. |
| 8,234,417 B2 | 7/2012 | Kottomtharayil et al. |
| 8,234,468 B1 * | 7/2012 | Deshmukh .......... G06F 11/1453 711/162 |
| 8,244,841 B2 | 8/2012 | Shaji et al. |
| 8,266,406 B2 | 9/2012 | Kavuri |
| 8,266,615 B2 | 9/2012 | Shapiro |
| 8,285,681 B2 | 10/2012 | Prahlad et al. |
| 8,285,898 B2 | 10/2012 | Amit et al. |
| 8,306,926 B2 | 11/2012 | Prahlad et al. |
| 8,307,177 B2 | 11/2012 | Prahlad et al. |
| 8,327,050 B2 | 12/2012 | Amit et al. |
| 8,335,789 B2 | 12/2012 | Hull et al. |
| 8,341,182 B2 | 12/2012 | Muller et al. |
| 8,346,733 B2 | 1/2013 | Gokhale et al. |
| 8,346,734 B2 | 1/2013 | Muller et al. |
| 8,347,088 B2 | 1/2013 | Moore et al. |
| 8,352,433 B2 | 1/2013 | Crescenti et al. |
| 8,364,652 B2 | 1/2013 | Vijayan et al. |
| 8,402,000 B2 | 3/2013 | Gokhale et al. |
| 8,407,190 B2 | 3/2013 | Prahlad et al. |
| 8,412,848 B2 * | 4/2013 | Therrien .............. H03M 7/3084 707/637 |
| 8,417,678 B2 | 4/2013 | Bone et al. |
| 8,422,733 B2 | 4/2013 | Reisman |
| 8,433,679 B2 | 4/2013 | Crescenti et al. |
| 8,463,753 B2 | 6/2013 | Gokhale et al. |
| 8,463,994 B2 | 6/2013 | Kottomtharayil |
| 8,478,876 B2 | 7/2013 | Paul et al. |
| 8,484,165 B2 | 7/2013 | Gokhale et al. |
| 8,510,573 B2 | 8/2013 | Muller et al. |
| 8,527,549 B2 | 9/2013 | Cidon |
| 8,539,118 B2 | 9/2013 | Kottomtharayil et al. |
| 8,572,330 B2 | 10/2013 | Kottomtharayil et al. |
| 8,572,706 B2 | 10/2013 | Lucovsky et al. |
| 8,578,120 B2 | 11/2013 | Attarde et al. |
| 8,600,998 B1 | 12/2013 | Chaudhary et al. |
| 8,620,286 B2 | 12/2013 | Stannard et al. |
| 8,626,128 B2 | 1/2014 | Limont et al. |
| 8,635,204 B1 | 1/2014 | Xie et al. |
| 8,656,068 B2 | 2/2014 | Kottomtharayil et al. |
| 8,661,216 B2 | 2/2014 | Kavuri et al. |
| 8,671,209 B2 | 3/2014 | Awano |
| 8,688,641 B1 | 4/2014 | Cook et al. |
| 8,695,058 B2 | 4/2014 | Batchu et al. |
| 8,700,578 B1 | 4/2014 | Varadan et al. |
| 8,706,976 B2 | 4/2014 | Kottomtharayil et al. |
| 8,712,959 B1 | 4/2014 | Lim et al. |
| 8,756,203 B2 | 6/2014 | Muller et al. |
| 8,825,591 B1 | 9/2014 | Lai et al. |
| 8,832,031 B2 | 9/2014 | Kavuri et al. |
| 8,832,044 B1 | 9/2014 | Gipp et al. |
| 8,849,761 B2 | 9/2014 | Prahlad et al. |
| 8,849,762 B2 | 9/2014 | Kumarasamy et al. |
| 8,850,140 B2 | 9/2014 | De Atley et al. |
| 8,886,853 B2 | 11/2014 | Kottomtharayil et al. |
| 8,924,428 B2 | 12/2014 | Muller et al. |
| 8,931,107 B1 | 1/2015 | Brandwine |
| 8,938,481 B2 | 1/2015 | Kumarasamy et al. |
| 8,966,017 B2 | 2/2015 | Wipfel et al. |
| 8,996,823 B2 | 3/2015 | Kottomtharayil et al. |
| 9,027,076 B2 | 5/2015 | Roach et al. |
| 9,069,799 B2 | 6/2015 | Vijayan et al. |
| 9,244,779 B2 | 1/2016 | Littlefield et al. |
| 9,529,871 B2 | 12/2016 | Vibhor et al. |
| 9,557,929 B2 | 1/2017 | Littlefield et al. |
| 2002/0010661 A1 | 1/2002 | Waddington et al. |
| 2002/0032613 A1 | 3/2002 | Buettgenbach et al. |
| 2002/0049778 A1 | 4/2002 | Bell et al. |
| 2002/0069324 A1 | 6/2002 | Gerasimov et al. |
| 2002/0087950 A1 | 7/2002 | Brodeur et al. |
| 2003/0055671 A1 | 3/2003 | Nassar |
| 2003/0065759 A1 | 4/2003 | Britt et al. |
| 2003/0101155 A1 | 5/2003 | Gokhale et al. |
| 2003/0134619 A1 | 7/2003 | Phillips et al. |
| 2003/0220901 A1 | 11/2003 | Carr et al. |
| 2004/0054607 A1 | 3/2004 | Waddington et al. |
| 2004/0073677 A1 | 4/2004 | Honma et al. |
| 2004/0083202 A1 | 4/2004 | Mu et al. |
| 2004/0107199 A1 | 6/2004 | Dalrymple et al. |
| 2004/0186847 A1 | 9/2004 | Rappaport et al. |
| 2004/0192260 A1 | 9/2004 | Sugimoto et al. |
| 2004/0193953 A1 | 9/2004 | Callahan et al. |
| 2005/0008163 A1 | 1/2005 | Leser et al. |
| 2005/0021524 A1 | 1/2005 | Oliver |
| 2005/0033913 A1 | 2/2005 | Kottomtharayil et al. |
| 2005/0039069 A1 | 2/2005 | Prahlad et al. |
| 2005/0076264 A1 | 4/2005 | Rowan et al. |
| 2005/0102203 A1 | 5/2005 | Keong |
| 2005/0125807 A1 | 6/2005 | Brady et al. |
| 2005/0174869 A1 | 8/2005 | Kottomtharayil et al. |
| 2005/0177828 A1 | 8/2005 | Graham et al. |
| 2005/0210304 A1 | 9/2005 | Hartung et al. |
| 2005/0246342 A1 | 11/2005 | Vernon |
| 2006/0004639 A1 | 1/2006 | O'Keefe |
| 2006/0004675 A1 | 1/2006 | Bennett et al. |
| 2006/0011720 A1 | 1/2006 | Call |
| 2006/0069886 A1 | 3/2006 | Tulyani |
| 2006/0075007 A1 | 4/2006 | Anderson et al. |
| 2006/0095385 A1 | 5/2006 | Atkinson et al. |
| 2006/0100912 A1 | 5/2006 | Kumar et al. |
| 2006/0106881 A1 | 5/2006 | Leung et al. |
| 2006/0161879 A1 | 7/2006 | Lubrecht et al. |
| 2006/0169769 A1 | 8/2006 | Boyarsky et al. |
| 2006/0224846 A1 | 10/2006 | Amarendran et al. |
| 2006/0248165 A1 | 11/2006 | Sridhar et al. |
| 2006/0282194 A1 | 12/2006 | Schaefer et al. |
| 2006/0288044 A1 | 12/2006 | Kashiwagi et al. |
| 2007/0130105 A1 | 6/2007 | Papatla |
| 2007/0185912 A1 | 8/2007 | Gupta et al. |
| 2008/0077622 A1 | 3/2008 | Keith |
| 2008/0147621 A1 | 6/2008 | Newman |
| 2008/0177806 A1 | 7/2008 | Cannon et al. |
| 2008/0243795 A1 | 10/2008 | Prahlad et al. |
| 2009/0319534 A1 | 12/2009 | Gokhale |
| 2010/0030528 A1 | 2/2010 | Smith et al. |
| 2010/0070466 A1 | 3/2010 | Prahlad et al. |
| 2010/0070474 A1 | 3/2010 | Lad |
| 2010/0070726 A1 | 3/2010 | Ngo et al. |
| 2010/0077453 A1 | 3/2010 | Mohanty |
| 2010/0082672 A1 | 4/2010 | Kottomtharayil et al. |
| 2010/0269164 A1 | 10/2010 | Sosnosky et al. |
| 2010/0318500 A1 | 12/2010 | Murphy et al. |
| 2010/0333116 A1 | 12/2010 | Prahlad et al. |
| 2011/0040736 A1 | 2/2011 | Kalaboukis et al. |
| 2011/0093672 A1 | 4/2011 | Gokhale et al. |
| 2011/0231852 A1 | 9/2011 | Gokhale et al. |
| 2011/0252071 A1 | 10/2011 | Cidon |
| 2011/0270833 A1 | 11/2011 | von Kaenel et al. |
| 2011/0306326 A1 | 12/2011 | Reed et al. |
| 2012/0150818 A1 | 6/2012 | Vijayan Retnamma et al. |
| 2012/0150826 A1 | 6/2012 | Vijayan Retnamma et al. |
| 2012/0185657 A1 | 7/2012 | Gokhale et al. |
| 2012/0240183 A1 | 9/2012 | Sinha |
| 2012/0254119 A1 | 10/2012 | Kumarasamy et al. |
| 2013/0054533 A1 | 2/2013 | Hao et al. |
| 2013/0238572 A1 | 9/2013 | Prahlad et al. |
| 2013/0275380 A1 | 10/2013 | Gokhale et al. |
| 2013/0318207 A1 | 11/2013 | Dotter |
| 2014/0046904 A1 | 2/2014 | Kumarasamy |
| 2014/0122435 A1 | 5/2014 | Chavda et al. |
| 2015/0012495 A1 | 1/2015 | Prahlad et al. |
| 2015/0269035 A1 | 9/2015 | Vijayan |
| 2016/0100007 A1 | 4/2016 | Prahlad et al. |

(56) References Cited

U.S. PATENT DOCUMENTS

| | | | |
|---|---|---|---|
| 2016/0292040 | A1 | 10/2016 | Kumarasamy |
| 2017/0060431 | A1 | 3/2017 | Kochunni et al. |

FOREIGN PATENT DOCUMENTS

| | | |
|---|---|---|
| EP | 0467546 A2 | 1/1992 |
| EP | 0620553 | 10/1994 |
| EP | 0757317 A2 | 2/1997 |
| EP | 0774715 A1 | 5/1997 |
| EP | 0809184 A1 | 11/1997 |
| EP | 0899662 A1 | 3/1999 |
| EP | 0981090 A1 | 2/2000 |
| JP | 7254204 | 10/1995 |
| JP | 9044381 | 2/1997 |
| JP | 9081424 | 3/1997 |
| WO | WO-9513580 A1 | 5/1995 |
| WO | WO-9912098 A1 | 3/1999 |
| WO | WO-2005/024573 | 3/2005 |
| WO | WO-2008154448 | 12/2008 |

OTHER PUBLICATIONS

Allen, "Probability, Statistics and Queuing Theory," (1978), p. 370, col. 19, Lines 3-33, 2 pages.

Armstead et al., "Implementation of a Campwide Distributed Mass Storage Service: The Dream vs. Reality," IEEE, Sep. 11-14, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Ashton et al., "Two Decades of policy-based storage management for the IBM mainframe computer", www.research.ibm.com, published Apr. 10, 2003, printed Jan. 3, 2009, 19 pages.

Backup your social media content with MyCube Vault [retrieved on Oct. 30, 2014] Retrieved from internet; http://web.archive.org/web/20110606160223/http://www.kullin.net/2010/11/backup-your-social-media-content-with-mycube-vault/; published on Jun. 6, 2011 as per Wayback Machine.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Campbell, C.: "Linux and Windows NT 4.0: Basic Administration—Part III" Internet Publication, [Online] Oct. 5, 2000, Retrieved from the Internet: URL: <http://linux.omnipotent.net/article.php?article_id=10933> [retrieved on Aug. 22, 2006], 6 pages.

Carrington, D.: "Backups Using the "at" Command", Internet Publication, [Online] May 4, 1999, Retrieved from the Internet: URL: <http://groups.google.de/group/microsoft.public.windowsnt.misc/browse_thread/thread/d1406a9a8391afea/48bac300a0adcc7a?lnk=st&q=&rnum=12&hl=de#48bac300a0adcc7a> [retrieved on Aug. 22, 2006], 1 page.

Cook, P.: "ntbackup: eject tape at end of backup?" Internet Publication, [Online] Oct. 18, 2000, Retrieved from the Internet: URL: <http://groups.google.de/group/microsoft.public.windowsnt.misc/browse_thread/thread/8f67f0cc96df42b7/0ab1d93a6f91b511?lnk=st&q=%22ntbackup+eject%22+at&rnum=1&hl=de#0ab1d93a6f91b511> [retrieved on Aug. 22, 2006], 1 page.

Eitel, "Backup and Storage Management in Distributed Heterogeneous Environments," IEEE, Jun. 12-16, 1994, pp. 124-126.

Extended European Search Report in European Application No. 13767340.6, dated Aug. 19, 2015, 7 pages.

Gait, J., "The Optical File Cabinet: A Random-Access File System for Write-Once Optical Disks," IEEE Computer, vol. 21, No. 6, pp. 11-22 (Jun. 1988).

Gonzalez-Seco, Jose, "A Genetic Algorithm as the Learning Procedure for Neural Networks," International Joint Conference on Neural Networks, Jun. 1992, 356 pages.

International Search Report and Written Opinion for International Application No. PCT/US2013/029393; dated Jun. 27, 2013; 10 pages.

Jander, M., "Launching Storage-Area Net," Data Communications, US, McGraw Hill, NY, vol. 27, No. 4 (Mar. 21, 1998), pp. 64-72.

MDM: "Automatically eject tape", Internet Publication, [Online] Jun. 7, 1999, Retrieved from Internet: URL: <http://groups.google.de/group/microsoft.public.windowsnt.misc/browse_thread/thread/66537271a88cebda/2f8b1b96dfc5f102?lnk=st&q=&rnum=11&hl=de#2f8b1b96dfc5f102> [retrieved on Jun. 22, 2006], 1 page.

PageFreezer Website Archiving & Social Media Archiving [retrieved on Aug. 1, 2014], Retrieved from internet: http://webarchive.org/web/20120303012345/http://pagefreezer.com/blog; published on Mar. 3, 2012 as per Wayback Machine.

Recycle Bin (Windows), Aug. 2007, Wikipedia, pp. 1-3.

Rosenblum et al., "The Design and Implementation of a Log-Structured File System," Operating Systems Review SIGOPS, vol. 25, No. 5, New York, US, pp. 1-15 (May 1991).

Savill, J., "Windows NT FAQ Single File Version—Section Backup's" Internet Publication, [Online] 2000, Retrieved from Internet: URL: <http://burks.bton.ac.uk/burks/pcinfo/osdocs/ntfaq/ntfaq_09.htm> [retrieved on Aug. 22, 2006], 8 pages.

Supplementary European Search Report in European Application No. 13767340.6, dated Sep. 4, 2015, 1 page.

U.S. Appl. No. 15/377,299 for Vibhor et al., filed Dec. 13, 2016.

* cited by examiner

| Job ID | Chunk ID | Logical Offset, Length | Physical Media ID | Physical Offset, Length |
|---|---|---|---|---|
| A5629 | 1 | LO1, LL1 | Media A | PO1, PL1 |
| A5629 | 2 | LO2, LL2 | Media B | PO2, PL2 |
| A5629 | 3 | LO3, LL3 | Media A | PO3, PL3 |
| ... | ... | ... | ... | ... |

*FIG. 4*

DATA RECOVERY OPERATIONS, SUCH AS RECOVERY FROM MODIFIED NETWORK DATA MANAGEMENT PROTOCOL DATA

CROSS-REFERENCE TO RELATED APPLICATIONS

This application is a continuation application of U.S. patent application Ser. No. 15/005,209, filed Jan. 25, 2016, entitled DATA RECOVERY OPERATIONS, SUCH AS RECOVERY FROM MODIFIED NETWORK DATA MANAGEMENT PROTOCOL DATA, now U.S. Pat. No. 9,557,929, which is a divisional application of U.S. patent application Ser. No. 13/241,625, filed Sep. 23, 2011, entitled DATA RECOVERY OPERATIONS, SUCH AS RECOVERY FROM MODIFIED NETWORK DATA MANAGEMENT PROTOCOL DATA, now U.S. Pat. No. 9,244,779, which claims the benefit of U.S. Patent Application No. 61/388,554, filed Sep. 30, 2010, entitled DATA RECOVERY OPERATIONS, SUCH AS RECOVERY FROM MODIFIED NETWORK DATA MANAGEMENT PROTOCOL DATA, each of which is hereby incorporated herein by reference in its entirety.

BACKGROUND

Current storage management systems employ a number of different methods to perform storage operations on electronic data. For example, data can be stored in primary storage as a primary copy that includes production data, or in secondary storage as various types of secondary copies including, as a backup copy, a snapshot copy, a hierarchical storage management copy ("HSM"), as an archive copy, and as other types of copies.

A primary copy of data is generally a production copy or other "live" version of the data that is used by a software application and is generally in the native format of that application. Primary copy data may be maintained in a local memory or other high-speed storage device that allows for relatively fast data access. Primary copy data is typically intended for short term retention (e.g., several hours or days) before some or all of the data is stored as one or more secondary copies, for example to prevent loss of data in the event a problem occurred with the data stored in primary storage.

Secondary copies include point-in-time data and are typically intended for long-term retention (e.g., weeks, months or years depending on retention criteria), before some or all of the data is moved to other storage or is discarded. Secondary copies may be indexed so users can later browse, search and restore the data. After primary copy data is backed up, a pointer or other location indicia such as a stub may be placed in the primary copy to indicate the current location of that data. Further details may be found in the assignee's U.S. Pat. No. 7,107,298, filed Sep. 30, 2002, entitled SYSTEM AND METHOD FOR ARCHIVING OBJECTS IN AN INFORMATION STORE.

One type of secondary copy is a backup copy. A backup copy is generally a point-in-time copy of the primary copy data stored in a backup format as opposed to in native application format. For example, a backup copy may be stored in a backup format that is optimized for compression and efficient long-term storage. Backup copies generally have relatively long retention periods and may be stored on media with slower retrieval times than other types of secondary copies and media (e.g., on magnetic tape), or be stored at on offsite location.

Another form of secondary copy is a snapshot copy. From an end-user viewpoint, a snapshot may be thought as a bitmap or instant image of the primary copy data at a given point in time. A snapshot may capture the directory structure of a primary copy volume at a particular moment in time, and may also preserve file attributes and contents. In some embodiments, a snapshot may exist as a virtual file system, parallel to the actual file system. Users may gain a read-only access to the record of files and directories of the snapshot. By electing to restore primary copy data from a snapshot taken at a given point in time (e.g., via a reversion process), users may also return the current file system to the prior state of the file system that existed when the snapshot was taken.

A snapshot may be created instantly, using a minimum of file space, but may still function as a conventional file system backup. A snapshot may not actually create another physical copy of all the data, but may simply create pointers that map files and directories to specific disk blocks and that indicate which blocks have changed. The snapshot may be a copy of a set of files and/or directories as they were at a particular point in the past. That is, the snapshot is an image, or representation, of a volume of data at a point in time. A snapshot may be as a secondary copy of a primary volume of data, such as data in a file system, an Exchange server, a SQL database, an Oracle database, and so on. The snapshot may be an image of files, folders, directories, and other data objects within a volume, or an image of the blocks of the volume.

Snapshots may be created using various techniques, such as copy-on-write, redirect-on-write, split mirror, copy-on-write with background copy, log structure file architecture techniques, continuous data protection techniques, and/or other techniques. Once a snapshot has been taken, subsequent changes to the file system typically do not overwrite the blocks in use at the time of a snapshot. Therefore, the initial snapshot may use only a small amount of disk space to record a mapping or other data structure representing or otherwise tracking the blocks that correspond to the current state of the file system. Additional disk space is usually only required when files and directories are actually modified later. Furthermore, when files are modified, typically only the pointers which map to blocks are copied when taking a new snapshot, not the blocks themselves. For example in the case of copy-on-write snapshots, when a block changes in primary storage, the block is copied to secondary storage before the block is overwritten in primary storage and the snapshot mapping of file system data is updated to reflect the changed block(s) at that particular point in time, e.g., the pointer in that snapshot now points to the old block now in secondary storage.

Data storage systems may utilize snapshots for a variety of reasons. One typical use of snapshots is to copy a volume of data without disabling access to the volume for a long period. After performing the snapshot, the data storage system can then copy the data set by leveraging the snapshot of the data set. As another example, a data storage system may use a snapshot and/or other point-in-time secondary copies (e.g., copies generated from a snapshot) to permit a user to revert data back to its state at a specific point in time during a reversion process.

An HSM copy is generally a copy of the primary copy data, but which typically includes only a subset of the primary copy data that meets a certain criteria and is usually stored in a format other than the native application format. For example, an HSM copy might include only that data from the primary copy that is larger than a given size threshold or older than a given age threshold and that is stored in a backup format. Often, HSM data is removed from the primary copy, and an address, pointer or stub is stored in the primary copy to indicate its new location. When a user requests access to the HSM data that has been removed or migrated, systems use the stub to locate the data and often make recovery of the data appear transparent even though the HSM data may be stored at a location different from the remaining primary copy data.

An archive copy is generally similar to an HSM copy, however the data satisfying criteria for removal from the primary copy is generally completely removed with no stub left in the primary copy to indicate the new location (i.e., where it has been moved to). Archive copies of data are generally stored in a backup format or other non-native application format. In addition, archive copies are generally retained for very long periods of time (e.g., years) and in some cases are never deleted. Such archive copies may be made and kept for extended periods in order to meet compliance regulations or for other permanent storage applications.

Application data over its lifetime typically moves from more expensive quick access storage to less expensive slower access storage. This process of moving data through these various tiers of storage is sometimes referred to as information lifecycle management ("ILM"). This is the process by which data is "aged" from more expensive forms of secondary storage with faster access/restore times down through less expensive secondary storage with slower access/restore times, for example, as the data becomes less important or mission critical.

In some embodiments, storage management systems may perform additional operations upon copies, including deduplication, content indexing, data classification, data mining or searching, electronic discovery (E-discovery) management, collaborative searching, encryption and compression.

One example of a system that performs storage operations on electronic data that produce such copies is the Simpana storage management system by CommVault Systems of Oceanport, N.J. The Simpana system leverages a modular storage management architecture that may include, among other things, storage manager components, client or data agent components, and media agent components as further described in U.S. Pat. No. 7,246,207, filed Apr. 5, 2004, entitled "SYSTEM AND METHOD FOR DYNAMICALLY PERFORMING STORAGE OPERATIONS IN A COMPUTER NETWORK." The Simpana system also may be hierarchically configured into backup cells to store and retrieve backup copies of electronic data as further described in U.S. Pat. No. 7,395,282, filed Jul. 15, 1999, entitled "HIERARCHICAL BACKUP AND RETRIEVAL SYSTEM."

The Simpana system and other storage systems may perform backup and Direct Access Recovery ("DAR") storage operations under the Network Data Management Protocol ("NDMP"), an open standard protocol for backups of heterogeneous network-attached storage across an enterprise. Under the NDMP standard, during backup, an NDMP data server is responsible for creating backup data and sending it to an NDMP mover in a data stream format specified by the NDMP protocol. To the NDMP mover, the data stream may appear to be simply a raw stream of bytes or bits. The NDMP mover is then responsible for writing the data stream to backup or secondary storage media, such as tape. The NDMP mover may be on the same physical machine as the data server, or different machine. During a restore or recovery of a backed-up data object, the NDMP data server is responsible for requesting NDMP-formatted backup data from the mover and restoring the data object to a target location from that backup data, e.g., a target location in primary storage. To request a backup copy of a data object, the NDMP data server sends an offset and length that identify the location of the data object in the original NDMP data stream that was sent to the NDMP mover at backup. Using the offset and length information provided by the NDMP data server, the NDMP mover retrieves the desired data from the backup media and returns it to the NDMP data server in the form of an NDMP-formatted data stream.

Unfortunately, NDMP standards do not readily facilitate restore operations if the NDMP mover modified the NDMP data stream via encryption, compression, deduplication, etc., before writing the data to tape or other secondary storage media. These modification techniques may alter the data in an unpredictable way. For example, when an NDMP data stream is deduplicated and/or compressed, the total size of the modified data that must be stored is typically much smaller than the size of the original NDMP data stream. However, the modified data is not simply a linearly "scaled down" version of the original data stream. Instead, the original data stream is scaled down unevenly in a manner that depends on the contents of the original data stream and/or the types of modification techniques that are applied to the original data stream. Since these modification techniques alter the data in an unpredictable manner, at the time of restore, the NDMP mover can no longer use the offset and length provided by the NDMP data server to correctly retrieve and return requested data objects. For example, if a data object was originally represented in an original NDMP backup data stream at offset OF1 and length L1, the modified version of that object may instead be stored in modified form with an offset OF2 and length L2; furthermore, there may be no closed-form mathematical relationship to automatically derive OF2 and L2 from OF1 and L1. Thus, if the data mover receives a request from an NDMP data server to retrieve an object using offset and length values OF1 and L1, the data mover may be unable to fulfill the request.

The Simpana system and other storage systems may also permit users to perform a reversion operation in order to return client data to a previous state at a specified point in time by using a previously obtained point-in-time copy, such as a snapshot copy or other secondary copy. However, this reversion operation will effectively erase all changes to that data that were made after the specified point in time. Thus, such a reversion operation is irreversible, since a user cannot undo the reversion operation in order to return data to its state at the time the reversion operation was performed.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following detailed description.

BRIEF DESCRIPTION OF THE DRAWINGS

FIG. 4 is an example chunk mapping table that shows how a secondary storage computing device may provide a mapping between physical and logical locations of modified NDMP backup data.

In the drawings, the same reference numbers and acronyms identify elements or acts with the same or similar functionality for ease of understanding and convenience.

DETAILED DESCRIPTION

The headings provided herein are for convenience only and do not necessarily affect the scope or meaning of the claimed invention.

Overview

The systems and methods described herein permit storage systems to correctly perform direct access recovery of NDMP backup data that was modified prior to its storage in secondary storage media, such as tape. For example, as described in greater detail herein, the systems and methods may permit NDMP backup data to be encrypted, compressed, deduplicated, and/or otherwise modified prior to storage. During a direct access recovery operation, the systems and methods described herein permit an NDMP data server to use index information (such as logical offsets and/or lengths) generated by the NDMP data server in order to request an unmodified version of NDMP data that was previously stored in modified form.

The systems and methods described herein also permit a user to perform a precautionary snapshot of the current state of data (e.g., primary data) prior to reverting data to a previous state using point-in-time data. In this way, a reversion process becomes reversible, instead of irreversible, because data that would otherwise be erased or overwritten by a reversion process is first captured via a snapshot operation.

Various examples of the invention will now be described. The following description provides specific details for a thorough understanding and enabling description of these examples. One skilled in the art will understand, however, that the system may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description.

Suitable Environments

Figure 1:
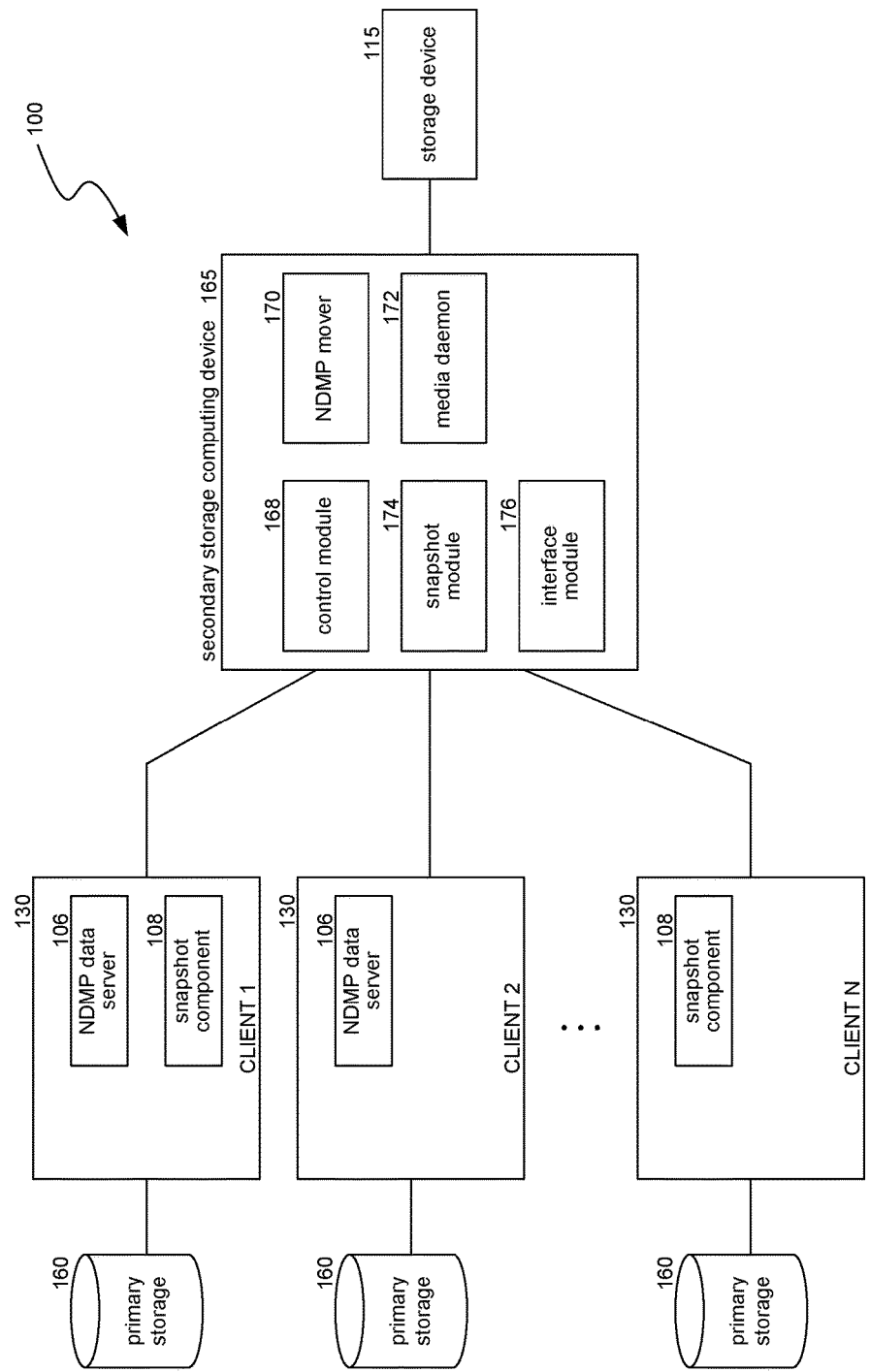
FIG. 1 is a block diagram illustrating an environment in which aspects of the invention may be configured to operate.

FIG. 1 is a block diagram illustrating an environment 100 in which aspects of the invention may be configured to operate. The environment 100 includes one or more clients 130, one or more primary data stores 160, a secondary storage computing device 165 (or alternatively "media agent"), and one or more storage devices 115. Each of the clients 130 is a computing device, examples of which are described herein. The clients 130 are each connected to one or more associated primary data stores 160 and to the secondary storage computing device 165. The secondary storage computing device is connected to a storage device 115. The primary data stores and storage device may each be any type of storage suitable for storing data, such as Directly-Attached Storage (DAS) such as hard disks, a Storage Area Network (SAN), e.g., a Fibre Channel SAN, an iSCSI SAN or other type of SAN, Network-Attached Storage (NAS), a tape library, or any other type of storage. The clients 130 and the secondary storage computing device 165 typically include application software to perform desired operations and an operating system on which the application software runs. The clients 130 and the secondary storage computing device 165 typically also include a file system that facilitates and controls file access by the operating system and application software. The file system facilitates access to local and remote storage devices for file or data access and storage.

The clients 130, as part of their functioning, utilize data, which includes files, directories, metadata (e.g., access control lists (ACLs), descriptive metadata, and any creation/edit dates associated with the data), and other data objects, which may be stored in an associated primary data store 160. (More details as to the storage operations involving ACLs may be found in the assignee's U.S. patent application Ser. No. 12/058,518, entitled "SYSTEM AND METHOD FOR STORAGE OPERATION ACCESS SECURITY", the entirety of which is incorporated by reference herein.)) The data of a client 130, which is stored in a primary data store 160, is generally a primary copy (e.g., a production copy). Although described as a "client" of the secondary storage computing device 165, a client 130 may in fact be a production server, such as a file server or Exchange server, which provides live production data to multiple user workstations as part of its function. During a copy, backup, snapshot, archive or other storage operation, the clients 130 send a copy of data objects in a primary data store 160 to the secondary storage computing device 165.

Some clients 130, such as client 1 and client 2, may include an NDMP data server 106 configured to permit the client to perform NDMP backup and direct access recovery (DAR) (or "restore") storage operations, as described in greater detail herein. Some clients, such as client 1 and client N, may include a snapshot component 108 configured to permit the client to perform snapshot operations, including taking snapshots and performing data reversions from a snapshot or other point-in-time data, as described in greater detail herein. As shown in FIG. 1, a single client may comprise an NDMP data server 106, a snapshot component 108, and/or both. Of course, clients may also contain other components that perform other functions.

The secondary storage computing device 165 may include various components that perform various functions. These components include an NDMP mover 170, a control module 168, a media daemon 172, a snapshot module 174, and an interface module 176. The NDMP mover permits the secondary storage computing device to perform NDMP backup and direct access recovery (DAR) storage operations, as described in greater detail herein. The NDMP mover is configured to communicate with the NDMP data server 106 during NDMP backup and restore operations. The control module is configured to control NDMP backup and restore operations, and the media daemon is configured to store and retrieve a modified version of an NDMP data stream in the storage device 115. The NDMP mover and/or media daemon are also configured to modify data received from the NDMP data server via operations such as deduplication, encryption, modification, indexing, and/or the addition of metadata, before the data is stored in the storage device 115. The snapshot module 174 is configured to facilitate snapshot operations upon data (e.g., data stored in primary data stores 160), and to permit a client 130 to revert to earlier versions of data using snapshots or other point-in-time data. The interface module 176 is configured to present user interfaces that permit a user to initiate a reversion operation and select options associated with that reversion. The functionality of each of these components is described in greater detail herein.

Together, the NDMP data server 106 on a client 130 and the NDMP mover 170 on the secondary storage computing device 165 facilitate NDMP backup and restore operations of the primary data in the client's associated primary data store 160. Turning to an NDMP backup operation first, generally speaking, the control module 168 communicates with the NDMP data server in order to configure and initiate an NDMP copy operation or "backup job" of a set of primary data from the primary data store (such as a volume, subclient, or file system). For example, the control module may instruct the NDMP data server to package the set of primary data into an NDMP backup data stream and to send the NDMP data stream to a specified data port on the secondary storage computing device. The configuration of the backup operation, including which set of data is backed up and other configuration parameters, may be specified by a storage policy and/or schedule policy, as described in greater detail herein. The control module may also cause the NDMP mover 170 to begin listening for the incoming NDMP backup data stream on the specified port. In accordance with the control module's instructions and NDMP protocols, the NDMP data server packages up the specified set of primary data from the primary data store into an NDMP-formatted backup data stream and begins sending the data stream to the NDMP mover, which receives the data stream, e.g., at the specified port. The precise format of the NDMP data stream may be dependent upon the type of NDMP data server that is sending the stream, so that effectively the NDMP mover cannot parse or discern a file-level or directory-level organization within the NDMP data stream. Instead, from the NDMP mover's perspective, the NDMP data stream may be seen simply as an ordered collection, or stream, of raw bytes or bits that needs to be stored. Any contiguous subset of data within the NDMP data stream may be described by a "logical offset" and "logical length" that together indicate the position of the subset within the larger stream (e.g., at an offset from the origin or head of the stream).

As the NDMP backup data stream is received, the NDMP mover 170 takes additional steps to modify the data stream and store the modified data in a manner that permits later retrieval and restoration of a portion of the original received NDMP backup data stream. The NDMP mover 170 may set up a data pipeline from the NDMP mover to the media daemon 172 to convey the received data stream (or a modified form thereof) to the media daemon. The NDMP mover and/or the media daemon may perform modifying operations upon the received NDMP data stream (e.g., encryption, deduplication, compression, indexing, adding metadata). The NDMP mover may perform modifying operations before sending the modified data to the media daemon and/or the media daemon may modify the data it receives from the NDMP mover. The media daemon writes the modified data to a storage device 115 in chunks. As described in greater detail herein, the media daemon also generates mapping information for each chunk. The mapping information associates each chunk of modified data stored with (1) a "physical offset" and a "physical length" that reflect where the chunk of modified data is physically stored within the storage device, and (2) a logical offset and a logical length that are associated with the contiguous subset of the unmodified NDMP backup data stream that was received by the NDMP mover and subsequently modified to create the chunk of modified data. In other words, the mapping information correlates the original NDMP offset and length parameters with new physical locations on the storage device.

While it is packaging data and sending the NDMP backup data stream during a backup job, the NDMP data server 106 may also locally generate and/or store index information or file history information; alternatively, or additionally, the NDMP data server may embed such information within the NDMP backup data stream (e.g., at the beginning or end of the data stream). The index information or file history information may associate each data object (e.g., file, directory, or sub-file data object) embodied within the data stream with a logical offset and logical length of the data object within the original data stream (these values indicate the object's position or location in the stream) and/or provide information about directory structures or other logical organizations that may also be defined by logical offset and logical length descriptors. The NDMP data server may also intermittently or periodically provide such index information to the NDMP mover 170; for example, it may send the index information for a batch of objects in the backup job. The media daemon 172 may store this index information, e.g., in the storage device 115. However, the NDMP data server typically provides its index information post-hoc, after the related portion of the data stream has already been received, modified, and/or stored by the NDMP mover and/or media daemon. Thus, typically, the media daemon cannot use the received index information to generate a mapping of data objects to physical offsets in real-time as the modified data is being written to the storage device 115.

Turning now to an NDMP direct access recovery or restore operation, at a later time, the NDMP data server 106 may restore data objects that were backed up during a backup operation to a target location (e.g., a target location in primary data store 160). As part of the restoration, the NDMP mover may retrieve and echo back stored information about the NDMP backup operation or job, such as indexing information or file history information that was generated and sent by the NDMP data server 106 at the time of the backup operation. Using this index information (or other index information, e.g., information stored locally by the NDMP data server), the NDMP data server may send one or more requests for a portion of a specified NDMP backup stream by providing a desired logical offset and a logical length that identify a desired contiguous subset of the original, unmodified NDMP backup data stream sent during the backup job. The NDMP mover 170 may then send the provided logical offset and logical length to the media daemon, which utilizes the mapping information to translate the provided logical offset and logical length into physical offsets and physical lengths that reflect where a modified version of the requested subset of the data stream has been physically stored in the storage device 115. Using those physical offsets and lengths, the media daemon may retrieve or read the modified data from the storage device 115, convert the retrieved modified data back into an NDMP-formatted data stream that contains the backup data associated with the logical offset and logical length, and send the desired portion of the NDMP-formatted data stream back to the NDMP data server, e.g., via the NDMP mover. More details about NDMP backup and restore operations, including mapping information, are provided herein with respect to FIGS. 3, 4, and 5.

Normally, a reversion process that involves reverting data to a previous state using point-in-time data such as a snapshot is "irreversible" because the reversion process may erase and/or overwrite all or portions of a table that indicates the current state of data (e.g., an active block table or block map) at the moment just before the reversion process is initiated and/or may overwrite blocks of data. Thus, effectively, a reversion process irreversibly erases or overwrites current data, since that data is no longer accessible to a user. As described in greater detail herein, the secondary storage computing device 165, including its snapshot module 174 and/or interface module 176, and/or the snapshot component 108 on a client 130 may permit a user to perform a precautionary snapshot of the current state of data (e.g., in a primary data store 160) prior to reverting data to a previous state using point-in-time data. In this way, the reversion process becomes reversible instead of irreversible, because data that would otherwise be erased or overwritten by a reversion process is captured via a snapshot.

The snapshot component 108 on the client 130 creates snapshots of the client's data. The snapshot component 108 includes software components and may also include hardware and/or firmware components. The snapshot component 108 may be provided in its entirety by a single entity (for example, a single vendor), or the snapshot component 108 may include sub-components that are provided by different entities (such as multiple vendors). In some examples, the snapshot component includes a Microsoft Volume Shadow Copy Service (VSS) sub-component and a software-based VSS provider sub-component that is provided by the assignee of the present application, CommVault Systems, Inc. In these examples, a data agent (not shown) associated with the client interacts with the Microsoft VSS sub-component to create snapshots. In other examples, in addition to or as an alternative to the software-based VSS provider sub-component, the snapshot component 108 includes other software-based VSS provider sub-components, such as a Microsoft system software provider, a Microsoft Data Protection Manager provider sub-component or a NetApp SnapManager provider sub-component. In other examples, in addition to the Microsoft VSS sub-component, the snapshot component 108 includes one or more hardware-based VSS provider sub-components, such as those provided by vendors such as Hewlett-Packard, EMC, NetApp, IBM, and other vendors. Those of skill in the art will understand that the snapshot component 108 may include various software-based and/or hardware-based sub-components, and may interact with other components in various ways in order to create snapshots of a client's data.

The snapshot component 108 may create snapshots using various techniques, such as copy-on-write, redirect-on-write, split mirror, copy-on-write with background copy, log structure file architecture techniques, continuous data protection techniques, and/or other techniques. The snapshot component 108 may also perform operations relating to reversion operations. The snapshot component 108 may store the created snapshots on a particular volume of the client 130.

The snapshot module 174 may also copy snapshots from the client 130 to another storage device, such as the storage device 115, and/or maintain index information for snapshots. The snapshot module may also utilize snapshots from a client to create other point-in-time secondary copies of a client's data. The snapshot module may also be configured to perform functions similar to the snapshot component 108.

The secondary storage computing device 165 also includes the interface module 176. The interface module 176 provides access to the copied snapshot data. The interface module 176 can be used to access data objects created in other types of secondary copies, such as backup copies, archive copies, and other types of copies. The interface module 176 can also be used to display to a user available snapshots or point-in time-copies of the data that can be used for reversion, recovery, or other purposes.

Snapshot operations and reversions from snapshots and other secondary copies are described in greater detail in commonly assigned applications U.S. Provisional Application No. 61/291,805, filed Dec. 31, 2009, entitled "SYSTEMS AND METHODS FOR ANALYZING SNAPSHOTS", U.S. Provisional Application No. 61/291,803, filed Dec. 31, 2009, entitled "SYSTEMS AND METHODS FOR PERFORMING DATA MANAGEMENT OPERATIONS USING SNAPSHOTS", and U.S. application Ser. No. 12/558,947, filed Sep. 14, 2009, entitled "USING A SNAPSHOT AS A DATA SOURCE," now U.S. Published Application No. US 20100070726, all of which are hereby incorporated herein in their entirety.

Figure 2:
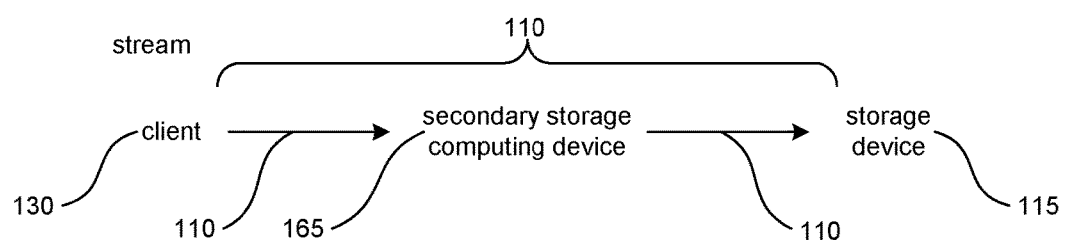
FIG. 2 is a block diagram illustrating components of a data stream that may be used in a suitable data storage system.

The above system may be incorporated within a data storage system and may be subjected to or receive a data stream during a data copy operation. Referring to FIG. 2, a block diagram illustrating components of a data stream 110 utilized by a suitable data storage and recovery system is shown. The data stream 110 may include client 130, a secondary storage computing device 165, and a storage device 115. For example, in storage operations, the system may store, receive, and/or prepare data to be stored, copied, or backed up at a client. The system may then transfer the data to be stored to the secondary storage computing device, which may then refer to storage policies, schedule policies, and/or retention policies (and other policies) in order to choose a storage device. The secondary storage computing device may include or be associated with an intermediate component, to be discussed herein.

The storage device 115 receives the data from the secondary storage computing device 165 and stores the data as a secondary copy, such as a backup copy, archive copy, and/or snapshot copy. Secondary storage devices may be magnetic tapes, optical disks, USB and other solid-state memory media, disk, and tape drives, and so on.

NDMP Backup Operation

Figure 3:
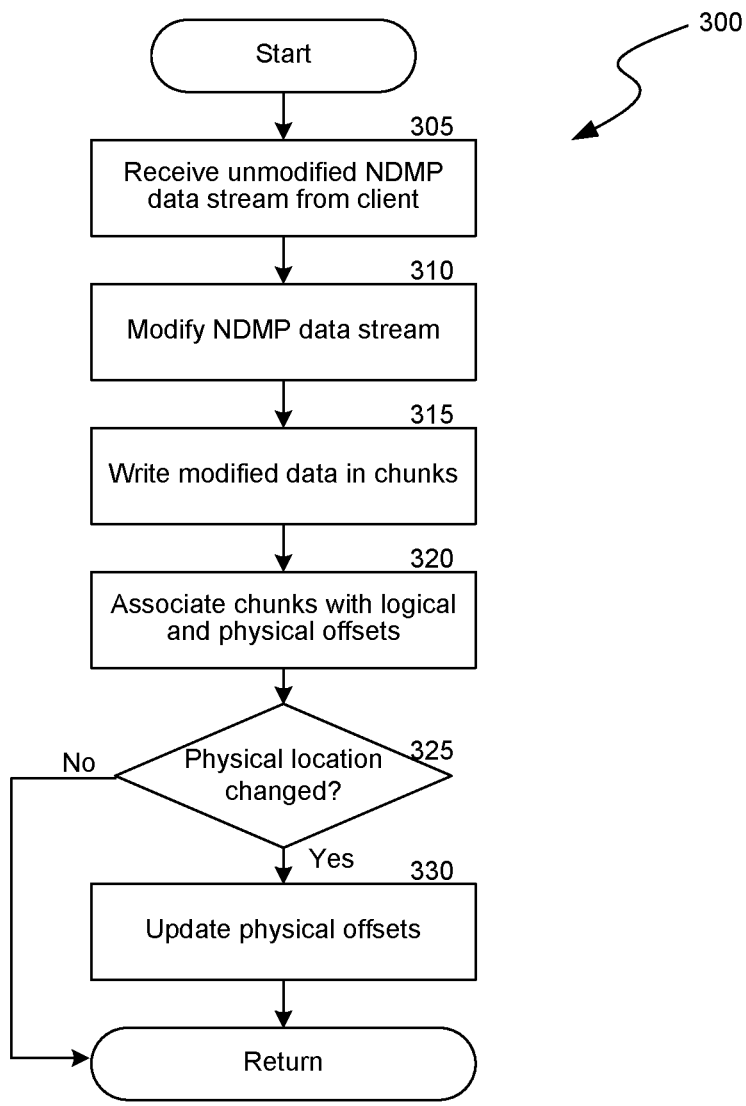
FIG. 3 is a flow diagram illustrating a process for performing an NDMP backup operation, wherein the NDMP data stream is modified prior to storage.

FIG. 3 is a flow diagram illustrating a process 300 for performing an NDMP backup operation, wherein the NDMP backup data stream is modified prior to its storage. The processes shown in FIGS. 3 and 5 may be performed by components of the secondary storage computing device 165 (e.g., NDMP mover 170 and/or media daemon 172), and/or other systems or components.

Before beginning the process 300, a component of the secondary storage computing device 165, such as the control module 168, may trigger or initiate the backup operation or job in accordance with applicable storage and/or schedule policies, and/or at the request of other system components (such as a storage manager, discussed herein). For example, the control module may instruct an NDMP data server 106 resident on a client 130 to initiate an NDMP backup operation upon a subset of the client's data storage (e.g., a volume, sub-client, and/or file system) in an associated primary data store 160 and to send an NDMP backup data stream to a specified port. As another example, the control module may start an NDMP mover 170 process for the backup job and direct the NDMP mover to listen for an NDMP backup data stream at a specified port and/or may start a media daemon 172 process for the job. The control module may also take other steps, such as further configuring the NDMP backup operation (e.g., identifying a storage device 115 to use during the operation).

As shown, the process 300 begins at block 305, when the NDMP mover 170 receives an unmodified NDMP backup data stream from an NDMP data server 106 resident on a client 130, such as in response to an instruction sent to the NDMP data server. For example, the NDMP mover 170 may receive the stream by listening at a specified port.

At block 310, the NDMP mover 170 and/or another component such as the media daemon 172 modifies the received NDMP backup data stream by various modification procedures, such as the modification procedures described below. The examples of data modification procedures provided below are intended to be illustrative, not exhaustive, and any suitable data modification techniques may be employed at block 310. Furthermore, at block 310, the NDMP mover 170 or other components may perform any combination of modification procedures, such as those described below, and may perform modification procedures in any order. For example, more details regarding how the secondary storage computing device 165 can simultaneously support encryption, compression, and/or deduplication may be found in the assignee's U.S. application Ser. No. 12/145,342, filed Jun. 24, 2008, entitled "APPLICATION-AWARE AND REMOTE SINGLE INSTANCE DATA MANAGEMENT," now U.S. Published Application No. US 20090319585. The NDMP mover 170 may perform some or all of the modification procedures before sending the data to the media daemon 172. Alternatively, or additionally, the media daemon may receive the NDMP data stream (either unmodified or modified) from the NDMP mover and perform modification procedures upon the data stream it receives.

As one example, at block 310, the NDMP mover 170 or the media daemon 172 may encrypt the received data stream using well-known techniques. For example, the system may employ encryption techniques that satisfy Federal Information Processing Standards (FIPS). Further details about encryption and encrypting copies of data may be found in commonly assigned U.S. Patent Publication No. US2008-0320319A1, filed on Mar. 31, 2008, entitled SYSTEM AND METHOD FOR ENCRYPTING SECONDARY COPIES OF DATA. As another example, the NDMP mover may compress the received data stream using well-known techniques. For example, the system may employ many different well-known techniques or applications for compressing data, including Lempel-Ziv (LZ) techniques, DEFLATE techniques, and LZ-Renau (LZR) techniques. As yet another example, at block 310, the NDMP mover may add additional metadata to the data stream.

As yet another example, at block 310, the NDMP mover 170 or the media daemon 172 may perform deduplication upon the received data stream, either before or after encryption and/or compression. Generally speaking, deduplication refers to storing a single or reduced number of instances of a unique data object or unique data block (or other multiple-byte or multiple-bit unit of data) in secondary storage. For example, the system may store in secondary storage one or more instances, but fewer than the total number of instances, of each unique data object or unique data block.

Overall, at block 310, the NDMP mover 170 or the media daemon 172 may perform object-level, sub-object-level, block-level or multi-byte-/multi-bit-level deduplication procedures and/or encryption procedures and/or compression procedures via techniques that create "chunk folders" and similar deduplication data structures.

In examples described in more detail in the assignee's U.S. patent application Ser. No. 12/565,576, filed Sep. 23, 2009, entitled "SYSTEMS AND METHODS FOR MANAGING SINGLE INSTANCING DATA," now U.S. Published Application No. US 20100082672, the NDMP mover 170 or the media daemon 172 stores the modified data in a data structure comprising a chunk folder when performing object- or sub-object-level deduplication. Contained within the chunk folder are three container files: 1) a metadata file; 2) an "N" file; and 3) an "S" file. The three files are each logical containers of data. The "S" file stores deduplicated data (e.g., deduplicated files). The "N" file stores data that is not deduplicated (e.g., metadata, such as descriptive metadata associated with deduplicated files). The metadata file stores references to the location(s) of the data objects in the "S" file and the "N" file. Note that although three container files are described (S, N, and metadata index), a chunk folder may comprise more than one "S" file (e.g., S1, S2 . . . Sy, where y is an integer) to store deduplicated data and/or more than one "N" file (e.g., N1, N2 . . . Nz, where z is an integer). While described as being stored on the storage device 115, the "N" and metadata files may alternatively or additionally be stored elsewhere, such as on the secondary storage computing device and/or with a storage manager, described herein. The chunk folder and the container files may be equivalent to a directory and files (or folder and files) on a file system. For example, the chunk folder may be a directory and the container files may be files located within the directory. As another example, the chunk folder may be a file and the container files may be portions of the file. As another example, the container files may be collections of blocks, bytes, or bits grouped together. Those of skill in the art will understand that the chunk folder and the container files may be comprised in various data structures and are not limited to a directory and files within the directory.

During deduplication, an index file may be created within a data structure that consists of one or more stream headers and stream data. The stream header describes a data object contained in an "N" file or an "S" file (e.g., its location, its size, an offset within the file, etc.). The stream data contains the pointer to the data object contained in the "N" file or the "S" file. For example, the pointer may give its location within the "N" file or the "S" file. The location of the data object may be given by offsets within the "N" file or the "S" file. For example, its location may be given by a starting offset, and its length or size. As another example, its location may be given by a starting offset and an ending offset. As previously mentioned, the data object may be in an "S" file in another chunk folder, and the stream data would point to this "S" file in the other chunk folder (e.g., give its location in the "S" file in the other chunk folder). Each time the NDMP mover 170 or media daemon 172 places a data object in the "S" file, it may add a stream header and corresponding stream data to the index file.

In examples where block-level deduplication is performed at block 310, the data structures used to store modified data may include one or more volume folders, one or more chunk folders within a volume folder, and multiple files within a chunk folder. Each chunk folder includes a metadata file, a metadata index file, one or more container files, and a container index file. The metadata file stores non-deduplicated data blocks as well as links to deduplicated data blocks stored in container files. The metadata index file stores an index to the data in the metadata file. The container files store deduplicated data blocks. The container index file stores an index to the container files. Among other things, the container index file stores an indication of whether a corresponding block in a container file is referred to by a link in a metadata file. Those of skill in the art will understand that the volume folder and its constituent folders and files may be comprised in various data structures and are not limited to a directory and files within the directory; instead, e.g., they may be collections of blocks, bytes, or bits grouped together.

In some examples, chunk folders, volume folders, and/or their constituent files are stored in an archive file format. The archive file may be stored on various storage devices 115, such as on disk drives or on magnetic tapes, and may contain chunk folders and/or volume folders. The archive file may include, for example, a "chunk folder 0" located at offset 0, a "chunk folder 1" located at offset 5, a "chunk folder 2" located at offset 10, a "chunk folder 3" located at offset 15, and so on until a "chunk folder n" located at offset 65. The offsets may be expressed in relation to the start of the archive file. More details regarding a suitable archive file format may be found in the assignee's U.S. application Ser. No. 11/950,376, filed Dec. 4, 2007, entitled "SYSTEMS AND METHODS FOR CREATING COPIES OF DATA, SUCH AS ARCHIVE COPIES," now U.S. Published Application US 20080229037, the entirety of which is incorporated by reference herein. An archive file may be considered as a container of data objects.

At block 310, modification procedures may be performed separately upon different subsets of the NDMP backup data stream. For example the procedures may be performed separately upon different subsets of the NDMP backup data stream that are associated with different "chunks," as described in greater detail herein. For example, the NDMP mover 170 may perform a modification procedure or procedures (e.g., compression or encryption) upon the first 3 GB of an NDMP data stream as a subset, and then perform the same modification procedure upon the next 3 GB of an NDMP data stream as a subset.

Generally speaking, the modification operations performed at block 310 will create an unknown and unpredictable change in the volume of data that is needed to store the modified form of the received NDMP backup data stream. For example, if the received unmodified NDMP data stream is 1 GB, the volume of data needed to store the modified version of the NDMP data stream may be 1 GB, 0.75 GB, 0.2 GB, or any other value. The degree of change will depend on the contents of the data stream, the configuration settings, and the types and/or order of the modification operations that are performed at block 310. For example, deduplication will change (e.g., reduce) the volume of data that is stored during a backup or other storage operation; however, the amount of change is a function of the amount of redundancy that is present in a primary data set. As an example, if a received data set of 1 GB has 50% redundancy (e.g., each unique block appears twice), block-level deduplication may reduce the amount of data that is stored by approximately 50%. As another example, the level of compression achieved by a compression procedure may depend on the particular compression technique utilized. As yet another example, the addition of metadata prior to storage may increase the volume of the data that is stored. Furthermore, the modification procedures may create uneven volume changes through the entire NDMP data stream. For example, a deduplication procedure might reduce the first half of an NDMP data stream by a factor of two, but might reduce the second half of the NDMP data stream by a factor of three. Since the modification procedures change the volume of data in an unpredictable and/or uneven fashion, the logical offsets associated with the received original NDMP data stream may have no closed-form or predictable relationship to the offsets of a post-modification NDMP data stream or image.

At block 315, the NDMP mover 170 or media daemon 172 writes the modified data in "chunks" to the storage device 115. For example, the media daemon may write chunks of modified data to tape media. Each chunk written is a modified version of a contiguous subset of the received NDMP backup data stream that is associated with a certain logical offset and logical length.

In some examples, each "chunk" written at block 315 is a separate "chunk folder" and/or "volume folder" such as those deduplication data structures described previously. Alternatively, a "chunk" may be a sub-division of one of these deduplication data structures (e.g., a logical sub-division, a constituent file or folder, or an arbitrary sub-division (e.g., each chunk folder may be divided into approximately 0.5 GB chunks), a modified version of one of these deduplication data structures (e.g., a compressed version of a chunk folder), or a group of multiple deduplication data structures. In other examples, a "chunk" may simply refer to a subset of the modified data which is addressable (i.e., readable) by a media location, a physical offset, and a physical length (or a physical starting offset and physical ending offset). The length of each such chunk may be configurable. For example, at approximately every 1 GB "checkpoint" along the modified data stream, the media daemon 172 may simply define a new chunk.

In some examples, for each chunk, the media daemon 172 writes approximately 2 GB of modified data to the storage device 115. However, any chunk size may be used, and chunk size may be configurable, e.g., to tune the performance of restore operations. A storage policy may specify chunk size. Furthermore, during a single backup operation, chunk size may vary from one chunk to the next. Chunk size is typically expressed in terms of the amount of modified data that is written per chunk; however, the size of a chunk may instead be specified by or based on the amount of unmodified data that is associated with a given chunk and/or other characteristics of the unmodified data that is used to create a chunk. For example, each chunk may be chosen to correspond to approximately 5 GB of unmodified data, resulting in unevenly sized chunks being written during an operation. When chunks are stored in physical media, the series of chunks may or may not be stored sequentially or contiguously. Chunks also may or may not be demarcated or separated by separators such as file marks or separate file marks.

As described previously, the modifying operations performed at block 310 may destroy any relationship between the logical offset used by the NDMP data server 106 to identify a subset of the original NDMP data stream and the offsets of a post-modification NDMP data stream or image. Accordingly, at block 320, the NDMP mover 170 or media daemon 172 associates each chunk written with (1) the logical offset and logical length of the contiguous subset of the received original NDMP data stream that is now represented in modified form by the stored chunk, and (2) the physical offset and physical length indicative of where the chunk is stored within the storage device 115 (and possibly a physical media identifier that indicates the physical media on which the chunk is stored, such as a particular tape cassette). For example, at block 320, the NDMP mover or media daemon 172 may populate a table, such as the one shown in FIG. 4.

At a later time, the modified data that is written at block 315 may be moved from one physical location to a different physical location during a subsequent storage operation. For example, during a scheduled archive storage operation, some portion of the modified data written at block 315 may be copied or transferred to a new archive file on a new tape. Thus, at decision block 325, the NDMP mover or media daemon 172 determines whether one or more chunks of data that were written at block 315 are being moved to a changed physical location during a storage operation. If not, then the process 300 returns. Otherwise, if one or more chunks are being moved, then at block 330 the NDMP mover or media daemon updates the physical offsets, physical lengths, and/or physical media identifiers to indicate the new physical storage locations of those chunks. The process 300 then returns.

FIG. 4 shows an example chunk mapping table 400 that shows how a secondary storage computing device 165 may provide a mapping between physical and logical locations of modified NDMP backup data. Each row 425, 430, and 435 corresponds to a different chunk that has been written to a storage device 115 during an NDMP backup operation or job. The chunk mapping table may comprise one or more columns, including:

(1) a job identifier (ID) column 402 indicative of the NDMP backup operation or job during which the chunk was written, (2) a chunk ID column 405 indicative of a unique chunk identifier within an NDMP backup job, (3) a logical offset and length column 410 indicative of the portion of the unmodified NDMP backup data stream that was received during a backup job, and that is now represented in a modified form by the physical chunk;

(4) a physical media ID column 415 indicative of the media upon which the chunk is stored (e.g., a tape ID number), and (5) a physical offset and length column 420 indicative of a portion of the indicated physical media (e.g., tape) on which the chunk is physically stored.

The logical offset and length in the table are typically the same as the logical offset and length that the NDMP data server 106 would associate with the same subset of the unmodified NDMP backup data stream. For example, row 425 conveys mapping information for the first modified data chunk that was written as part of NDMP backup job number "A5629." This chunk corresponds to a modified version of the subset of the unmodified NDMP backup data stream for the job that is identified by the logical offset LO1 and the logical length LL1. As shown in row 430, the chunk of modified data was written to physical media in the storage device 115 (e.g., tape) identified as "Media A," with a physical offset P01 and physical length PL1. Of course, the secondary storage computing device 165 may store such mapping information in any other suitable format (e.g., a relational database), and/or some of the mapping information shown in Table 4 may be stored in other components within a storage system (e.g., such as in a storage manager described herein).

NDMP Restore Operation

Figure 5:
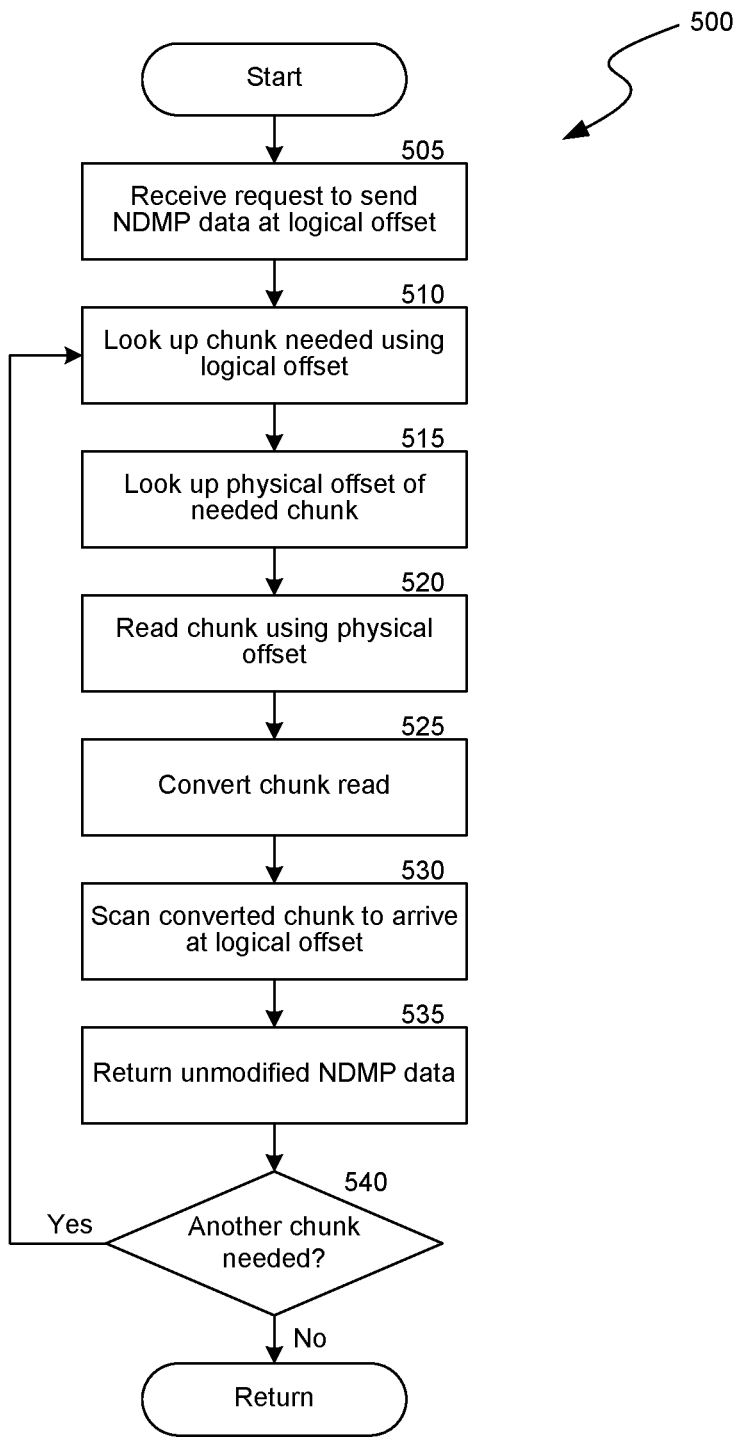
FIG. 5 is a flow diagram illustrating a process for restoring NDMP data that has been modified prior to storage.

FIG. 5 is a flow diagram illustrating a process 500 for restoring original NDMP backup data that was modified prior to storage. Prior to the beginning of the process, the NDMP data server 106 may determine a logical offset and logical length that it wishes to request from the NDMP mover 170 by using index information or file history information that relates backed up data objects to their logical offset and logical length within an NDMP backup data stream and/or provides information about directory structures or similar organizational information, etc. In some examples, the NDMP data server consults an index comprising this information that is stored at the NDMP data server to determine the logical offset and logical length needed to restore a data object or objects. In other examples, the NDMP data server may request that the control module provide such index information that was sent to the control module and stored during a particular job, and the NDMP mover may provide the requested index information to the NDMP data server. The NDMP data server may then use the provided index information to determine the logical offset and logical length needed to restore a data object or set of data objects. As yet another example, the NDMP data server may request the first N bytes (e.g., at logical offset zero) of the NDMP backup data stream for the job (or another portion of the NDMP data stream) if the NDMP data server embedded indexing information directly into the NDMP data stream. The NDMP data server may then parse out the embedded indexing information to determine the logical offset and logical length needed to restore specific data objects.

The process begins at block 505, when the NDMP mover 170 receives a request (e.g., a read request) to send a subset of an unmodified NDMP backup data stream associated with a particular backup operation or job. In order to identify the specific subset needed, the request may specify for example, a backup job identifier and/or a logical offset and logical length. The logical offset requested ("LOR") at block 505 may correspond to or fall at the beginning, end, or middle of a data chunk that was created and stored during the backup operation. Furthermore the logical offset may correspond to or fall within the first, last, or an intermediate data chunk created during the specified job. Similarly, the specified logical offset and the logical length requested ("LLR") may span more than one data chunk from the specified job.

At block 510, the NDMP mover 170 or media daemon 172 looks up the first chunk that is needed to satisfy the read request using the logical offset and logical length and any job identifier. To do so, the NDMP mover may use a job identifier and the logical offset and logical length as a lookup into a chunk mapping table or database, such as the example table shown in FIG. 4, to determine the chunk identifier associated with the chunk that spans the first part of the subset of the NDMP backup data stream that was requested. In the example shown in FIG. 4, if the NDMP mover receives a request to access the NDMP backup stream associated with job A5629 at a logical offset LOR that falls between LO2 and LO3, the NDMP mover may determine that the beginning of the desired subset of the data stream is stored somewhere in the chunk having the chunk ID 2, which is described by row 430 in the table 400.

At block 515, the NDMP mover 170 or media daemon 172 uses the chunk identifier determined at block 510 to look up the physical media identifier, physical offset, and physical length necessary to access the first needed chunk. To do so, the NDMP mover may use the chunk identifier as a lookup into a chunk mapping table or database, such as the example table shown in FIG. 4, to determine the physical media identifier, physical offset, and physical length associated with the first needed chunk. Continuing the previous example of Table 4, if the NDMP mover receives a request to access a logical offset LOR that falls between LO2 and LO3, the NDMP mover may access row 430 to determine that a modified form of the requested data is stored in the chunk stored on media associated with the identifier "Media B" at physical offset P02 and physical length PL2.

At block 520, the NDMP mover 170 or media daemon 172 uses the retrieved media identifier, physical offset, and physical length retrieved at block 515 in order to read the chunk of modified data. In the previous example, the NDMP mover or media daemon may access a tape B and begin reading at physical offset P02 until it has read data corresponding to physical length PL2.

At block 525, the NDMP mover 170 and/or media daemon 172 converts the chunk of modified data that is read at block 520 back into an unmodified NDMP data stream format by undoing or reversing each of the modifying procedures that was performed upon the original NDMP data stream. For example, the NDMP mover or media daemon may decompress compressed data, decrypt encrypted data, "rehydrate" deduplicated data by restoring multiple instances of data objects to the data stream, and/or remove metadata that was added during the backup operation. Various methods for reversing these modifying procedures are well-known in the art and/or are described in the commonly-assigned applications related to modification techniques that are incorporated by reference herein.

At block 530, the NDMP mover 170 or media daemon 172 scans the converted version of the chunk until it arrives at the logical offset needed to satisfy the data request. In the previous example, if the received requested logical offset LOR is equal to LO2+217, the NDMP mover may scan the converted version of chunk 2 until it reaches position 217 within the converted chunk. The NDMP mover may discard the preceding portion of the converted version of the chunk or cache it for later use (e.g., in local memory in order to respond quickly to anticipated read requests).

At block 535, the NDMP mover 170 uses the converted chunk to return an unmodified NDMP data stream starting at the requested logical offset, e.g., by sending it to a requesting NDMP data server 106. In the previous example, if the received requested logical offset LOR is equal to LO2+217, the NDMP mover may send a copy of the converted chunk starting at position 217. The NDMP mover will continue to send the unmodified NDMP data stream until the read request has been satisfied (i.e., the logical length requested has been reached) and/or the end of the converted chunk is reached.

Of course, blocks 520-535 may be performed in parallel to the extent that the modified data can be read, converted, scanned, and sent in a parallel manner. For example, the NDMP mover 170 and/or media daemon 172 may be reading the end of a stored chunk at the same time that it is converting a middle portion of the same chunk and sending the converted version of the first part of the same chunk. Similarly, the data that is being read, converted, scanned, and/or returned, may be buffered in any manner at any of blocks 520-535.

At decision block 540, the NDMP mover 170 or media daemon 172 determines whether it is necessary to read, convert, scan, and return a portion of another data chunk. For example, the NDMP mover may determine that the requested logical offset and logical length implicates more than one data block, because the requested subset of the NDMP data stream spans more than one chunk. If the NDMP mover determines that it needs to read another data chunk to satisfy the read request, the process may be repeated beginning at block 510, this time using an adjusted logical offset and logical length that reflect how a portion of the last chunk was read, converted, and sent to partially satisfy the read request.

Of course, different iterations of blocks 520-535 may be performed in parallel. For example, the NDMP mover 170 and/or media daemon 172 may be reading the beginning of a third physical chunk at the same time that it is converting a middle portion of a second physical chunk and sending the converted version of a first physical chunk.

In some examples, the NDMP mover 170 anticipates future read requests by buffering unmodified NDMP backup data that is obtained by reading and converting stored chunks. For example, at block 535, once the entire subset of the requested NDMP backup data stream corresponding to the requested logical offset LOR and logical length LLR has been sent, the NDMP mover may continue to buffer the contents of the converted chunk until it reaches the end of the converted chunk (or another point in the converted chunk). As another example, even if the read request does not require that the NDMP mover repeat steps 510-535 for another chunk (e.g., because the read request has been fully satisfied), the NDMP mover, at the conclusion of block 535, may look up the chunk that corresponds to the next or otherwise adjacent section of the NDMP backup data stream for the same job and perform blocks 515-535. While doing so, it may buffer the NDMP data generated at block 535. By doing so, the NDMP mover may be able to satisfy subsequent read requests more quickly, since often a series of read requests related to a restore operation implicate several subsets of a backup data stream that are near to one another.

Although the description of NDMP operations herein have primarily referred to sets of data as being associated with or addressable by an offset (e.g., either a physical offset or logical offset) and length (e.g., either a physical length or logical length), one having skill in the art will appreciate that this is equivalent to associating or addressing a subset of data by a starting offset and an ending offset, since these two quantities together inherently indicate a length.

Reversion Operation

Figure 6:
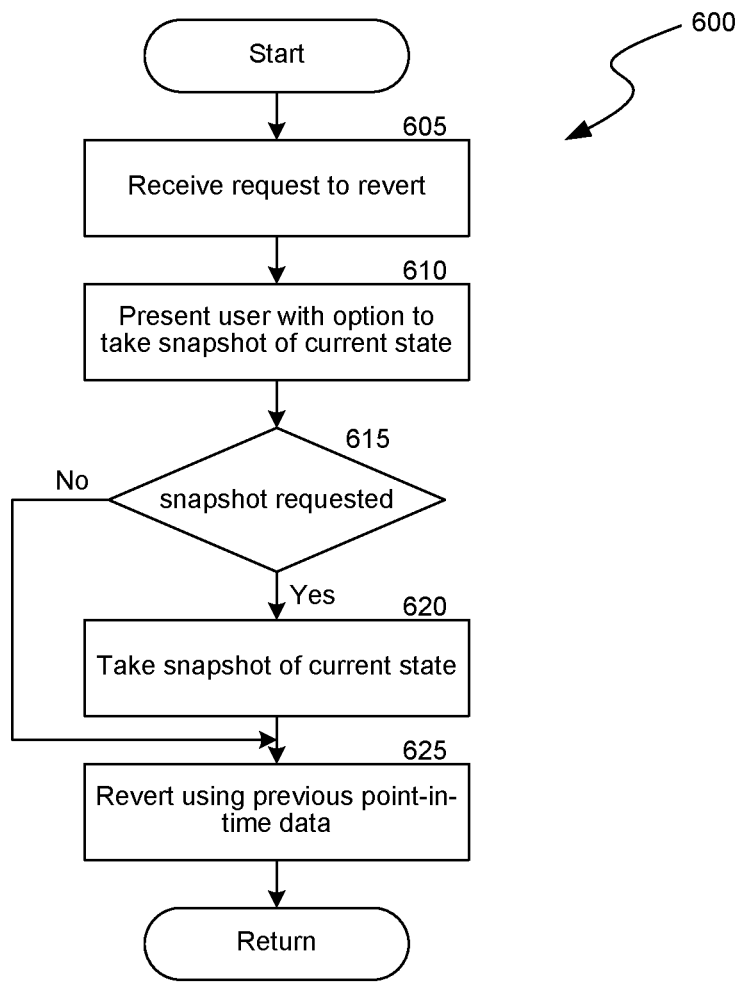
FIG. 6 shows a process for reverting data to a previous state, wherein the reversion process is reversible.

FIG. 6 shows a process 600 for reverting data, such as primary data stored in a primary data store 160, to a previous state, wherein the reversion process is reversible. The process may be performed by the secondary storage computing device 165 or components thereof (such as the snapshot module 174 and/or interface module 176), other components (such as a snapshot component 108 on a client 130), and/or other systems.

As shown, the process begins at block 605, when the secondary storage computing device 165 receives a request to revert data to its earlier state at a previous time using previously obtained point-in-time data, such as an earlier snapshot copy or backup copy. For example, a user may utilize a graphical user interface, (e.g., provided by the interface module 176) to browse previous snapshots of client data. Those snapshots and other secondary copies available to the user may be stored in a primary data store 160 and/or may be stored in snapshot format or another secondary format in a secondary storage device, such as storage device 115. The user may indicate that he wishes to revert to all of the data captured by a particular snapshot or secondary copy or only a particular subset of the data captured by a particular snapshot or secondary copy (e.g., a particular logical unit, disk volume, file server volume, file, email object, etc.).

Figure 7:
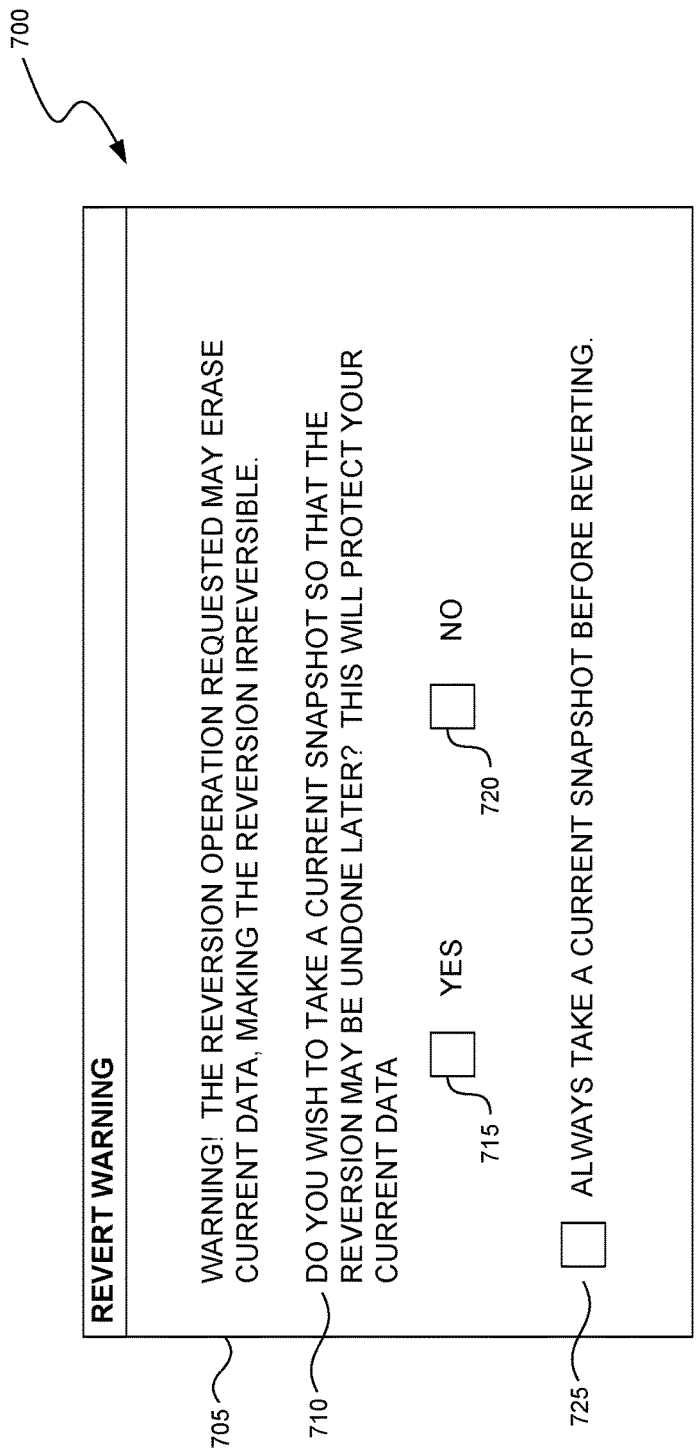
FIG. 7 illustrates an example graphical interface for permitting a user to perform a reversion operation from point-in-time data that is reversible.

At block 610, the secondary storage computing device 165 presents the user with the option to take a snapshot of the current state of data that will be partially or wholly overwritten or erased as a result of the requested reversion process, e.g., a snapshot of a logical unit of data that will be partially or wholly overwritten. For example, using the interface module 176, the secondary storage computing device may present the user with an interface such as the example interface 700 shown in FIG. 7. As shown in FIG. 7, the interface may include a warning message 705 that indicates that the requested reversion operation may erase or overwrite data (and may indicate what data will be erased/overwritten). The interface may provide a message 710 asking the user whether he wants to take a snapshot of the current state of the data that will be overwritten or erased and provides the user with input means 715, 720 such as check boxes, drop-down menus, "right-click" or similar interactive menus, or similar means to indicate whether a current snapshot should be taken before the requested reversion operation. The interface may also include a message and input means 725 for the user to select other options related to reversion operations, such as the option of always taking a current snapshot before reverting.

Referring again to FIG. 6, at decision block 615, the secondary storage computing device determines whether the user has requested that a current snapshot be taken. If yes, the process 600 proceeds to block 620; otherwise, the process proceeds to block 625. At block 620, the secondary storage computing device 165 takes (or requests the taking of) a snapshot of the current state of the data that will be erased or overwritten by the reversion operation (and possibly additional primary data; e.g., during a granular reversion operation, other data in the same logical unit as the data that will be overwritten/erased will also be captured by the precautionary snapshot). For example, the secondary storage computing device may instruct the snapshot module 174 on the secondary storage computing device 165 and/or the snapshot component 108 on a client 130 to initiate a snapshot, e.g., of a logical unit that is being reverted. Prior to taking a snapshot of the current state of the data that will be erased or overwritten by the reversion operation (or data in a related logical unit), the data may be put into a consistent state and brought offline (i.e., so that it is unavailable for modifications).

At block 625, the secondary storage computing device 165 reverts the requested data using the point-in-time data (e.g., the snapshot or other secondary copy) indicated at block 605 using procedures such as those described previously and/or other techniques known in the art. For example, the secondary storage computing device may instruct the snapshot module 174 on the secondary storage computing device 165 and/or the snapshot component 108 on a client 130 to initiate a reversion operation, e.g., of a logical unit that is being reverted. After the reversion, the requested data may be brought back online.

Although not shown in FIG. 6, after the conclusion of the process 600, a user may "undo" the reversion process. For example, a user may utilize a graphical user interface, (e.g., provided by the interface module 176) to indicate that he wishes to undo the reversion operation. As another example, the user may browse previous snapshots and other point-in-time copies of a client's data, including the precautionary snapshot taken in conjunction with a reversion operation during the process 600. The user may then indicate that he wishes to revert using the precautionary snapshot. In either example, the secondary storage computing device 165 may revert the data a second time using the precautionary snapshot (or alternatively, the secondary storage computing device may perform the process 600 again, this time using the precautionary snapshot as the requested reversion point).

Suitable System

Figure 8:
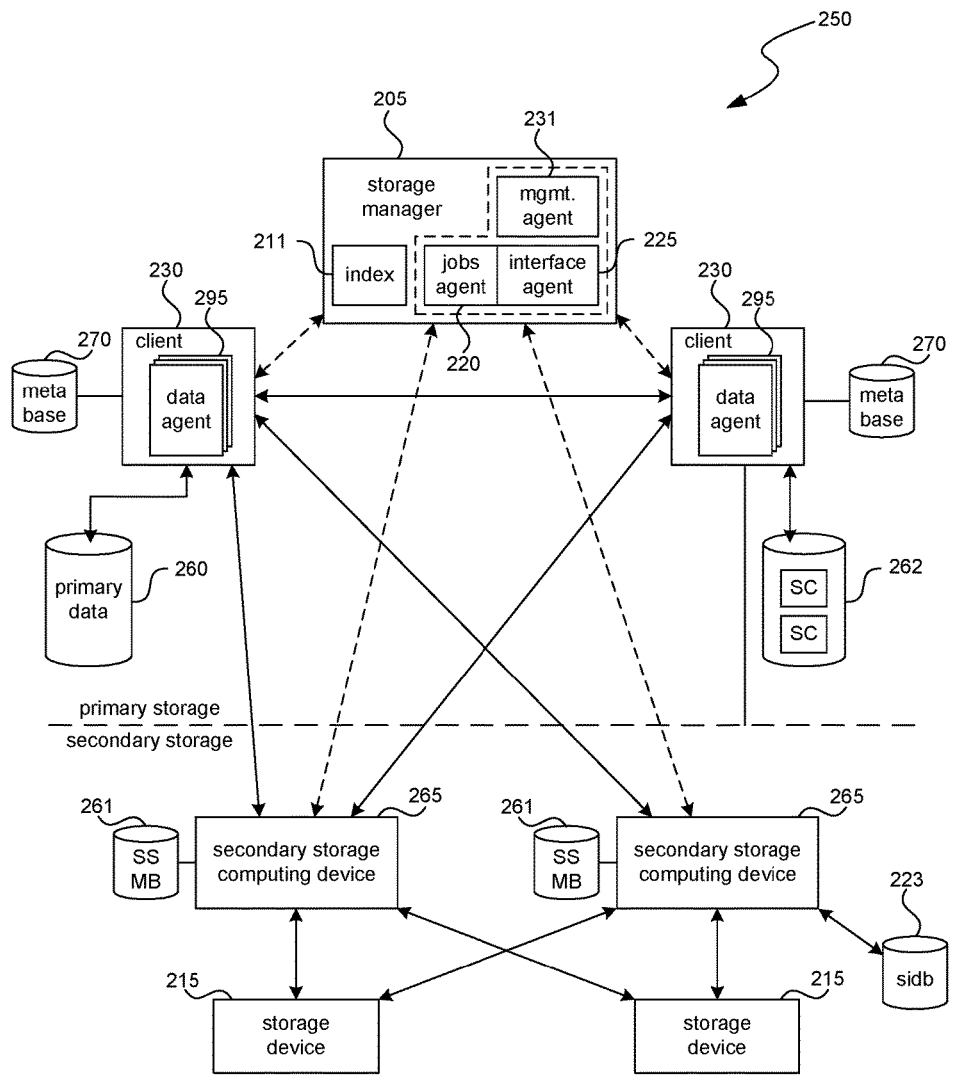
FIG. 8 is a block diagram illustrating an example of a data storage system.

FIG. 8 illustrates an example of one arrangement of resources in a computing network, comprising a data storage system 250. The resources in the data storage system 250 may employ the processes and techniques described herein. The system 250 includes a storage manager 205, one or more data agents 295, one or more secondary storage computing devices 265, one or more storage devices 215, one or more computing devices 230 (called clients 230), one or more data or information stores 260 and 262, a single instancing database 223, an index 211, a jobs agent 220, an interface agent 225, and a management agent 231. The system 250 may represent a modular storage system such as the CommVault QiNetix system, and also the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein. The system 250 may also represent a modular storage system such as the CommVault Simpana system, also available from CommVault Systems, Inc.

The system 250 may generally include combinations of hardware and software components associated with performing storage operations on electronic data. Storage operations include copying, backing up, creating, storing, retrieving, and/or migrating primary storage data (e.g., data stores 260 and/or 262) and secondary storage data (which may include, for example, snapshot copies, backup copies, hierarchical storage management (HSM) copies, archive copies, and other types of copies of electronic data stored on storage devices 215). The system 250 may provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In one example, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing (or deduplication) policy to apply to the data, and/or other criteria relating to a storage operation. For example, a storage policy may indicate that certain data is to be stored in the storage device 215, retained for a specified period of time before being aged to another tier of secondary storage, copied to the storage device 215 using a specified number of data streams, etc.

A "schedule policy" may specify a frequency with which to perform storage operations and a window of time within which to perform them. For example, a schedule policy may specify that a storage operation is to be performed every Saturday morning from 2:00 a.m. to 4:00 a.m. In some cases, the storage policy includes information generally specified by the schedule policy. (Put another way, the storage policy includes the schedule policy.) A "retention policy" may specify how long data is to be retained at specific tiers of storage or what criteria must be met before data may be pruned or moved from one tier of storage to another tier of storage. Storage policies, schedule policies and/or retention policies may be stored in a database of the storage manager 205, to archive media as metadata for use in restore operations or other storage operations, or to other locations or components of the system 250.

The system 250 may comprise a storage operation cell that is one of multiple storage operation cells arranged in a hierarchy or other organization. Storage operation cells may be related to backup cells and provide some or all of the functionality of backup cells as described in the assignee's U.S. patent application Ser. No. 09/354,058, now U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 205 (or management agent 231), a secondary storage computing device 265, a client 230, and other components as described herein. A second storage operation cell may contain the same or similar physical components; however, it may be configured to perform a second type of storage operation, such as storage resource management (SRM) operations, and may include monitoring a primary data copy or performing other known SRM operations.

Thus, as can be seen from the above, although the first and second storage operation cells are logically distinct entities configured to perform different management functions (i.e., HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 265, client 230, or other network device connected to a primary storage volume, while a storage operation cell configured to perform HSM tasks may instead include a secondary storage computing device 265, client 230, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 205 that coordinates storage operations via the same secondary storage computing devices 265 and storage devices 215. This "overlapping" configuration allows storage resources to be accessed by more than one storage manager 205, such that multiple paths exist to each storage device 215 facilitating failover, load balancing, and promoting robust data access via alternative routes.

Alternatively or additionally, the same storage manager 205 may control two or more storage operation cells (whether or not each storage operation cell has its own dedicated storage manager 205). Moreover, in certain embodiments, the extent or type of overlap may be user-defined (through a control console) or may be automatically configured to optimize data storage and/or retrieval.

Data agent 295 may be a software module or part of a software module that is generally responsible for performing storage operations on the data of the client 230 stored in data store 260/262 or other memory location. Each client 230 may have at least one data agent 295 and the system 250 can support multiple clients 230. Data agent 295 may be distributed between client 230 and storage manager 205 (and any other intermediate components), or it may be deployed from a remote location or its functions approximated by a remote process that performs some or all of the functions of data agent 295.

The overall system 250 may employ multiple data agents 295, each of which may perform storage operations on data associated with a different application. For example, different individual data agents 295 may be designed to handle Microsoft Exchange data, Lotus Notes data, Microsoft Windows 2000 file system data, Microsoft Active Directory Objects data, and other types of data known in the art. Other embodiments may employ one or more generic data agents 295 that can handle and process multiple data types rather than using the specialized data agents described above.

If a client 230 has two or more types of data, one data agent 295 may be required for each data type to perform storage operations on the data of the client 230. For example, to back up, migrate, and restore all the data on a Microsoft Exchange 2000 server, the client 230 may use one Microsoft Exchange 2000 Mailbox data agent 295 to back up the Exchange 2000 mailboxes, one Microsoft Exchange 2000 Database data agent 295 to back up the Exchange 2000 databases, one Microsoft Exchange 2000 Public Folder data agent 295 to back up the Exchange 2000 Public Folders, and one Microsoft Windows 2000 File System data agent 295 to back up the file system of the client 230. These data agents 295 would be treated as four separate data agents 295 by the system even though they reside on the same client 230.

Alternatively, the overall system 250 may use one or more generic data agents 295, each of which may be capable of handling two or more data types. For example, one generic data agent 295 may be used to back up, migrate and restore Microsoft Exchange 2000 Mailbox data and Microsoft Exchange 2000 Database data while another generic data agent 295 may handle Microsoft Exchange 2000 Public Folder data and Microsoft Windows 2000 File System data, etc.

Data agents 295 may be responsible for arranging or packing data to be copied or migrated into a certain format such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 205 or secondary storage computing devices 265. As used herein, a file or a data object refers to any collection or grouping of bytes of data that can be viewed as one or more logical units.

Generally speaking, storage manager 205 may be a software module or other application that coordinates and controls storage operations performed by the system 250. Storage manager 205 may communicate with some or all elements of the system 250, including clients 230, data agents 295, secondary storage computing devices 265, and storage devices 215, to initiate and manage storage operations (e.g., backups, migrations, data recovery operations, etc.).

Storage manager 205 may include a jobs agent 220 that monitors the status of some or all storage operations previously performed, currently being performed, or scheduled to be performed by the system 250. (One or more storage operations are alternatively referred to herein as a "job" or "jobs.") Jobs agent 220 may be communicatively coupled to an interface agent 225 (e.g., a software module or application). Interface agent 225 may include information processing and display software, such as a graphical user interface ("GUI"), an application programming interface ("API"), or other interactive interface through which users and system processes can retrieve information about the status of storage operations. For example, in an arrangement of multiple storage operations cells, through interface agent 225, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device 215).

Storage manager 205 may also include a management agent 231 that is typically implemented as a software module or application program. In general, management agent 231 provides an interface that allows various management agents 231 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 225. This allows each storage operation cell to send and receive certain pertinent information from other storage operation cells, including status information, routing information, information regarding capacity and utilization, etc. These communications paths may also be used to convey information and instructions regarding storage operations.

For example, a management agent 231 in a first storage operation cell may communicate with a management agent 231 in a second storage operation cell regarding the status of storage operations in the second storage operation cell. Another illustrative example includes the case where a management agent 231 in a first storage operation cell communicates with a management agent 231 in a second storage operation cell to control storage manager 205 (and other components) of the second storage operation cell via management agent 231 contained in storage manager 205.

Another illustrative example is the case where management agent 231 in a first storage operation cell communicates directly with and controls the components in a second storage operation cell and bypasses the storage manager 205 in the second storage operation cell. If desired, storage operation cells can also be organized hierarchically such that hierarchically superior cells control or pass information to hierarchically subordinate cells or vice versa.

Storage manager 205 may also maintain an index, a database, or other data structure 211. The data stored in database 211 may be used to indicate logical associations between components of the system, user preferences, management tasks, media containerization and data storage information or other useful data. For example, the storage manager 205 may use data from database 211 to track logical associations between secondary storage computing device 265 and storage devices 215 (or movement of data as containerized from primary to secondary storage).

Generally speaking, the secondary storage computing device 265, which may also be referred to as a media agent, may be implemented as a software module that conveys data, as directed by storage manager 205, between a client 230 and one or more storage devices 215 such as a tape library, a magnetic media storage device, an optical media storage device, or any other suitable storage device. In one embodiment, secondary storage computing device 265 may be communicatively coupled to and control a storage device 215. A secondary storage computing device 265 may be considered to be associated with a particular storage device 215 if that secondary storage computing device 265 is capable of routing and storing data to that particular storage device 215.

In operation, a secondary storage computing device 265 associated with a particular storage device 215 may instruct the storage device to use a robotic arm or other retrieval means to load or eject a certain storage media, and to subsequently archive, migrate, or restore data to or from that media. Secondary storage computing device 265 may communicate with a storage device 215 via a suitable communications path such as a SCSI or Fibre Channel communications link. In some embodiments, the storage device 215 may be communicatively coupled to the storage manager 205 via a SAN.

Each secondary storage computing device 265 may maintain an index, a database, or other data structure 261 that may store index data generated during storage operations for secondary storage (SS) as described herein, including creating a metabase (MB). For example, performing storage operations on Microsoft Exchange data may generate index data. Such index data provides a secondary storage computing device 265 or other external device with a fast and efficient mechanism for locating data stored or backed up. Thus, a secondary storage computing device index 261, or a database 211 of a storage manager 205, may store data associating a client 230 with a particular secondary storage computing device 265 or storage device 215, for example, as specified in a storage policy, while a database or other data structure in secondary storage computing device 265 may indicate where specifically the data of the client 230 is stored in storage device 215, what specific files were stored, and other information associated with storage of the data of the client 230. In some embodiments, such index data may be stored along with the data backed up in a storage device 215, with an additional copy of the index data written to index cache in a secondary storage device. Thus the data is readily available for use in storage operations and other activities without having to be first retrieved from the storage device 215.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 215. In some embodiments, the cached information may include information regarding format or containerization of archives or other files stored on storage device 215.

One or more of the secondary storage computing devices 265 may also maintain one or more single instance databases 223. Single instancing, a method of deduplication, generally refers to storing in secondary storage only a single instance of each data object (or data block) in a set of data (e.g., primary data). More details as to single instancing may be found in one or more of the following commonly-assigned U.S. patent applications: 1) U.S. application Ser. No. 11/269, 512, filed Nov. 7, 2004, entitled "SYSTEM AND METHOD TO SUPPORT SINGLE INSTANCE STORAGE OPERATIONS," now U.S. Published Application No. US 20060224846; 2) U.S. application Ser. No. 12/145,347, filed Jun. 24, 2007, entitled "APPLICATION-AWARE AND REMOTE SINGLE INSTANCE DATA MANAGEMENT," now U.S. Published Application No. US 20090319534; 3) U.S. application Ser. No. 12/145,342, filed Jun. 24, 2008, entitled "APPLICATION-AWARE AND REMOTE SINGLE INSTANCE DATA MANAGEMENT," now U.S. Published Application No. US 20090319585, 4) U.S. application Ser. No. 11/963,623, filed Dec. 21, 2007, entitled "SYSTEM AND METHOD FOR STORING REDUNDANT INFORMATION," now U.S. Published Application No. US 20080243879; and 5) U.S. application Ser. No. 11/950,376, filed Dec. 4, 2007, entitled "SYSTEMS AND METHODS FOR CREATING COPIES OF DATA SUCH AS ARCHIVE COPIES," now U.S. Published Application No. US 20080229037, each of which is incorporated by reference herein in its entirety.

In some examples, the secondary storage computing devices 265 maintain one or more variable instance databases. Variable instancing, a method of deduplication, generally refers to storing in secondary storage one or more instances, but fewer than the total number of instances, of each data block (or data object) in a set of data (e.g., primary data). More details as to variable instancing may be found in the commonly-assigned U.S. Provisional Application No. 61/164,803, filed Mar. 30, 2009, entitled "STORING A VARIABLE NUMBER OF INSTANCES OF DATA OBJECTS".

In some embodiments, certain components may reside and execute on the same computer. For example, in some embodiments, a client 230 such as a data agent 295, or a storage manager 205, coordinates and directs local archiving, migration, and retrieval application functions as further described in the previously-referenced U.S. patent application Ser. No. 09/610,738. This client 230 can function independently or together with other similar clients 230.

As shown in FIG. 8, each secondary storage computing device 265 has its own associated metabase or index 261. Each client 230 may also have its own associated metabase 270. However in some embodiments, each "tier" of storage, such as primary storage, secondary storage, tertiary storage, etc., may have multiple metabases or a centralized metabase, as described herein. For example, rather than a separate metabase or index associated with each client 230 in FIG. 8, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, etc.

Moreover, in operation, a storage manager 205 or other management module may keep track of certain information that allows the storage manager 205 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 230, and can contain either all of the data of the clients 230 or a designated subset thereof. As depicted in FIG. 8, the data store 262 includes two sub-clients. For example, an administrator (or other user with the appropriate permissions; the term administrator is used herein for brevity) may find it preferable to separate email data from financial data using two different sub-clients having different storage preferences, retention criteria, etc.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," "host," "host system," and the like, are generally used interchangeably herein and refer to any of the above devices and systems, as well as any data processor. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. Accordingly, the applicant reserves the right to add additional claims after filing the application to pursue such additional claim forms for other aspects of the invention. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for", but use of the term "for" in any other context is not intended to invoke treatment under 35 U.S.C. § 112, ¶6.

We claim:

1. A non-transitory computer-readable storage medium whose contents cause a data storage system to perform an operation for recovering Network Data Management Protocol ("NDMP") backup data, the operation comprising:
   receiving, at an NDMP mover, a request for an unmodified version of NDMP backup data stored in secondary storage media,
      wherein the NDMP backup data was modified by deduplication, encryption, and compression operations prior to being transferred from primary storage media to secondary storage media, and
      wherein the request including a logical offset and a logical length; and,
   returning, via the NDMP mover, the requested unmodified version of NDMP backup data using the received logical offset and logical length, by:
      identifying a stored chunk of data that comprises a modified version of at least a portion of the requested NDMP backup data, and
      determining a physical offset and a physical length that permits addressing of the identified chunk;
      reading at least a portion of the identified chunk using the determined physical offset and physical length; and,
      converting the portion of the identified chunk by reversing modifications previously performed upon the NDMP backup data to create a converted version of the portion of the identified chunk.

2. The computer-readable storage medium of claim 1,
   wherein returning the requested unmodified version of NDMP backup data using the received logical offset and logical length includes accessing an index using the received logical offset and logical length to identify from the index a physical offset and physical length associated with a physical data storage device, and
   wherein the physical offset and physical length permit addressing and accessing a chunk of data that represents a modified form of a portion of the requested NDMP backup data stored within the physical data storage device.

3. The computer-readable storage medium of claim 1, further comprising:
  determining that the NDMP backup data is being moved to a new physical location during a storage operation; and,
  associating the NDMP backup data and its associated logical offset and logical length with a new physical offset and new physical length that permits addressing of the NDMP backup data at its new physical location.

4. The computer-readable storage medium of claim 1, wherein the logical offset and logical length are associated with a physical offset and a physical length, which correspond to a magnetic tape location and a magnetic tape length associated with a magnetic tape that stores at least a portion of the NDMP backup data.

5. The computer-readable storage medium of claim 1, further comprising:
  receiving a request from a client to revert data to an earlier state at a previous time using previously obtained point-in-time data that is stored in a chunk as a modified version of NDMP data;
  receiving instructions that the client has requested that a snapshot of the current state of the data for the client be taken; and
  sending the user the reverted data.

6. A computer-implemented method for recovering Network Data Management Protocol (NDMP) backup data, the method comprising:
  receiving, at an NDMP mover, a request for an unmodified version of NDMP data that was modified prior to being stored in secondary storage media,
    wherein the NDMP data was modified by at least one of deduplication, encryption, or compression operations prior to being transferred from a primary storage media to secondary storage media, and
    wherein the request includes a logical offset and a logical length; and, returning, via the NDMP mover, the requested unmodified version of NDMP data using the received logical offset and logical length, by:
      accessing an index using the received logical offset and logical length to identify from the index a physical offset and physical length associated with a physical data storage device,
      wherein the physical offset and physical length permit addressing and accessing a chunk of data that represents a modified form of a portion of the requested NDMP backup data stored within the physical data storage device.

7. The method of claim 6, further comprising:
  determining that the NDMP data is being moved to a new physical location during a storage operation; and,
  associating the NDMP data and its associated logical offset and logical length with a new physical offset and new physical length that permits addressing of the NDMP data at its new physical location.

8. The method of claim 6, wherein the logical offset and logical length are associated with a physical offset and a physical length, which correspond to a magnetic tape location and a magnetic tape length.

9. The method of claim 6, further comprising:
  receiving a request from a client to revert data to an earlier state at a previous time using previously obtained point-in-time data that is stored in a chunk as a modified version of NDMP data;
  receiving instructions that the client has requested that a snapshot of the current state of the data for the client be taken; and
  sending the user the reverted data.

10. The method of claim 6, further comprising:
  using the received logical offset and logical length to:
    identify a stored chunk of data that comprises a modified version of at least a portion of the requested subset of the NDMP data, and
    determine a physical offset and a physical length that permits addressing of the identified chunk;
  reading at least a portion of the identified chunk using the determined physical offset and physical length; and,
  converting the portion of the identified chunk by reversing modifications previously performed upon the NDMP data to create a converted version of the portion of the identified chunk.

11. The method of claim 6, wherein the NDMP backup data was modified by deduplication, encryption, or compression before being transferred from the primary storage media to the secondary storage media.

12. A system, comprising:
  at least one processor;
  at least one data storage device coupled to the at least one processor and storing instructions for implementing a process to recover Network Data Management Protocol (NDMP) data, the process comprising:
    receiving a request for an unmodified version of NDMP data stored in secondary storage media,
      wherein the NDMP data was modified by deduplication, and by encryption, compression or both encryption and compression operations prior to being transferred from primary storage media to secondary storage media, and,
      wherein the request includes a logical offset and a logical length; and,
    returning the requested unmodified version of NDMP data using the received logical offset and logical length, by:
      identifying a stored chunk of data that comprises a modified version of at least a portion of the requested NDMP data;
      determining a physical offset and a physical length that permits addressing of the identified chunk;
      reading at least a portion of the identified chunk using the determined physical offset and physical length; and
      converting the portion of the identified chunk by reversing modifications previously performed upon the NDMP data to create a converted version of the portion of the identified chunk.

13. The system of claim 12, further comprising:
  determining that the NDMP data is being moved to a new physical location during a storage operation; and,
  associating the NDMP data and its associated logical offset and logical length with a new physical offset and new physical length that permits addressing of the NDMP data at its new physical location.

14. The system of claim 12, wherein the logical offset and logical length are associated with a physical offset and a physical length, which correspond to a magnetic tape location and a magnetic tape length.

15. The system of claim 12, further comprising:
  receiving a request from a client to revert data to an earlier state at a previous time using previously obtained point-in-time data that is stored in a chunk as a modified version of NDMP data;

receiving instructions that the client has requested that a snapshot of the current state of the data for the client be taken; and sending the user the reverted data.

* * * * *